US006988641B2

United States Patent
Jones et al.

(10) Patent No.: US 6,988,641 B2
(45) Date of Patent: Jan. 24, 2006

(54) BREWED ICED TEA OR NON-CARBONATED DRINK DISPENSER

(75) Inventors: Brian C. Jones, New Hartford, CT (US); David N. Evans, Ridgefield, CT (US); Scott A. Dzibela, Carmel, NY (US); John C. Nordenstrom, Blaine, MN (US); Sanjay Kumar, Bethel, CT (US); Russell J. Duchene, Torrington, CT (US); Allen L. Rogala, Torrington, CT (US); Michael J. Fodor, Torrington, CT (US); William K. Henninger, Southington, CT (US); Amir A. Faroqui, Chicopee, MA (US)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 10/662,467

(22) Filed: Sep. 16, 2003

(65) Prior Publication Data

US 2004/0056046 A1 Mar. 25, 2004

Related U.S. Application Data

(62) Division of application No. 09/965,829, filed on Oct. 1, 2001, now Pat. No. 6,685,059.
(60) Provisional application No. 60/236,170, filed on Sep. 29, 2000, and provisional application No. 60/294,571, filed on Jun. 1, 2001.

(51) Int. Cl.
*B67D 5/56* (2006.01)

(52) U.S. Cl. ............................. 222/129.1; 222/145.5; 222/146.2; 340/620

(58) Field of Classification Search .............. 222/129.1, 222/145.5, 146.2; 340/620
See application file for complete search history.

(56) References Cited

U.S. PATENT DOCUMENTS

| 2,660,351 A | 11/1953 | Thompson |
| 2,745,334 A | 5/1956 | Schwall |
| 3,634,107 A | 1/1972 | Cornelius |
| 3,790,028 A | 2/1974 | Gardner et al. .......... 222/129.4 |
| 4,300,603 A | 11/1981 | Laub, III .................... 141/258 |
| 4,309,939 A | 1/1982 | Stover |
| 4,470,999 A | 9/1984 | Carpiac ..................... 99/323.3 |
| 4,493,249 A | 1/1985 | Stover |
| 4,579,048 A | 4/1986 | Stover |
| 4,649,809 A | 3/1987 | Kanezashi .............. 222/129.4 |
| 4,773,313 A | 9/1988 | Anson |
| 4,804,118 A | 2/1989 | Mullen et al. |
| 4,856,676 A | 8/1989 | Emody |
| 4,920,871 A | 5/1990 | Anson et al. |
| 4,967,932 A | 11/1990 | Wiley et al. |
| 5,025,714 A | 6/1991 | Brewer |
| 5,134,925 A | 8/1992 | Bunn et al. |

(Continued)

Primary Examiner—Philippe Derakshani
(74) Attorney, Agent, or Firm—Lars S. Johnson; James D. Ryndak

(57) ABSTRACT

A beverage dispensing apparatus includes a dispensing device, at least one valve that distributes a diluent, a concentrate pump that distributes concentrate, a support structure that supports the foregoing components and exterior cladding attached to the support structure. The exterior cladding provides the appearance of a real leaf tea brewer. The diluent valve and concentrate pump distribute the diluent and concentrate into the dispensing device to form a mixture to be dispensed therefrom. The diluent can be hot water and the apparatus further includes an air ejector device for eliminating air bubbles from the hot water prior to mixing. In addition, an improved sensor can accurately determine when the supply of concentrate is depleted.

7 Claims, 15 Drawing Sheets

U.S. PATENT DOCUMENTS

| | | |
|---|---|---|
| 5,244,119 A | 9/1993 | Pittman |
| 5,305,924 A | 4/1994 | Groover et al. .......... 222/129.1 |
| 5,332,123 A | 7/1994 | Fëarber et al. |
| 5,332,311 A | 7/1994 | Volk, Jr. et al. |
| 5,375,508 A | 12/1994 | Knepler et al. |
| 5,393,540 A | 2/1995 | Bunn et al. |
| 5,433,349 A | 7/1995 | Romanyszyn, Jr. |
| 5,465,649 A | 11/1995 | Muis |
| D369,057 S | 4/1996 | Bradford |
| 5,524,791 A | 6/1996 | Credle, Jr. et al. ....... 222/129.1 |
| 5,575,405 A | 11/1996 | Stratton et al. |
| 5,579,678 A | 12/1996 | Goerndt |
| 5,733,591 A | 3/1998 | Goerndt |
| 5,773,067 A | 6/1998 | Freychet et al. |
| 5,875,703 A | 3/1999 | Rolfes .................... 222/146.5 |
| 5,975,365 A | 11/1999 | Hsieh |
| 5,992,298 A | 11/1999 | Illy et al. |
| D417,358 S | 12/1999 | Dutruel |
| D418,000 S | 12/1999 | Mork et al. |
| D419,362 S | 1/2000 | Bouhuys |
| D419,821 S | 2/2000 | Powell et al. |
| 6,082,247 A | 7/2000 | Beaulicu ..................... 99/283 |
| 6,142,063 A | 11/2000 | Beaulieu et al. ............. 99/283 |
| 6,152,327 A | 11/2000 | Rhine et al. ................. 222/88 |
| 6,182,555 B1 | 2/2001 | Scheer et al. ................ 99/290 |
| 6,240,829 B1 | 6/2001 | McGarrah |
| 6,272,973 B1 | 8/2001 | Fukushima et al. .......... 99/280 |
| 6,279,461 B1 | 8/2001 | Fukushima et al. .......... 99/280 |
| 6,305,268 B1 | 10/2001 | Schamberg et al. .......... 99/280 |
| 6,393,966 B1 | 5/2002 | Hart et al. ................... 99/280 |
| 6,685,059 B2 * | 2/2004 | Jones et al. ............... 222/129.1 |
| 2002/0129663 A1 | 9/2002 | Hoyt et al. |
| 2002/0129712 A1 | 9/2002 | Westbrook et al. |

\* cited by examiner

BREWED ICED TEA OR NON-CARBONATED DRINK DISPENSER

This application is a division of Application No. 09/965,829 filed Oct. 1, 2001 U.S. Pat. No. 6,685,059, which claims the benefit of U.S. Provisional Patent Application No. 60/236,170, filed Sep. 29, 2000, and No. 60/294,571, filed Jun. 1, 2001.

BACKGROUND OF THE INVENTION

1. Field of the Invention

The present invention relates to beverage forming and dispensing systems. More particularly, the present invention relates to beverage forming and dispensing systems for effectively preparing a beverage mixture from concentrate, and even more particularly to beverage forming and dispensing systems for effectively preparing a tea beverage mixture from concentrate.

2. Description of the Related Art

Beverages formed from concentrates are enjoyed around the world. An important advantage of forming a beverage from a concentrate is that only the concentrate need be shipped to the dispensing site; any available water supply at the site can be used to form the bulk of the final mixed product. An advantage in forming traditionally brewed drinks, such as tea and iced tea, from concentrate is that the time-consuming brewing process is eliminated.

There are many types of beverage making machines or appliances for forming beverages from concentrate. For example, U.S. Pat. No. 4,920,871 relates to a beverage making appliance in which hot water is discharged onto a brewing material, such as ground coffee or tea leaves, placed in a filter within a brewing funnel. In making iced tea, a brewed concentrate discharges from the brewing funnel and combines with cold water to form an iced tea stock. However, in this beverage-making appliance, the concentrate must first be brewed and the ratio of the cold water and hot water concentrate is not precisely metered.

U.S. Pat. Nos. 4,309,939 and 4,579,048 relate to beverage brewing apparatuses in which beverage concentrate is first brewed from a dry beverage making material in a funnel. The concentrate is distributed into a reservoir into which cold water is added to dilute the concentrate to an acceptable strength. However, the cold water is supplied to the reservoir after the hot concentrate begins to flow into the reservoir. Accordingly, the cold water and hot concentrate may stratify in the reservoir and not mix sufficiently.

U.S. Pat. No. 5,579,678 relates to an apparatus for automatically sweetening tea in which heated water combines with tea in a brewing station to form tea concentrate where it is mixed in a canister with a delivered sweetener. After sufficient tea concentrate is brewed and delivery of the sweetener is completed, a quantity of diluting water is mixed with the hot tea concentrate and dissolved sweetener. Because the diluting water is supplied after a complete batch of tea concentrate is brewed, the resulting mixture may stratify and not mix sufficiently. It is known to agitate a mixture for prevention of stratification and for more effective mixing. However, more complicated structure and greater power consumption is necessary to effect agitation.

Additionally, conventional leaf tea urns are costly to clean and operate, and are subject to undesirable and even dangerous growth of bacteria inside the urn. The tea itself is a food source for bacteria and the long residence times of tea product in the urn create an environment that promotes bacteria growth. Generally, bacteria colonies start to reproduce within several hours of making a fresh batch of tea. Typical post mix iced tea systems negate the disadvantages of the leaf tea brewing process by directly mixing tea syrup with cold water. However, since there is no brewing step, the finished tea product does not have the same visual and taste quality as real, fresh-brewed iced tea.

Typical post mix beverage syrup systems utilize sold out devices such as pressure switches to determine when the syrup concentrate is depleted. However, pumping rates for conventional systems are much higher than those encountered with a low pressure system, such as for a tea concentrate. In a conventional system, typically 15 ml per second of syrup concentrate are provided, and gas pumps are used to deliver the syrup. The pressure in the bags is 0 psig, and the pump draws syrup out of the bags and discharges it at pressures on the order of 60 psig. When the bag empties, the discharge pressure from the pump will drop to near 0 psig, and a switch opens to prevent further dispensing. In low pressure tea concentrate systems, a peristaltic pump is used to deliver low flow rates, typically 1.0 ml/sec, and with ability for precise metering. However, the conventional pressure switches are not suitable for detecting a sold out condition when the concentrate is delivered with a peristaltic pump, because the pump discharge pressure is typically less than 1.0 psig, which is outside of the sensitivity range of the pressure switch.

From the foregoing, it is apparent that there is still a need for an improved method and apparatus for automatically preparing beverages from concentrate and ensuring that the resulting beverage mixture is sufficiently mixed. It is also apparent that there is still a need for an improved method and apparatus for sensing a sold out condition of a concentrate in a low pressure type system.

SUMMARY OF THE INVENTION

The present invention can provide a method and apparatus for preparing a beverage from concentrate.

The present invention can also provide a method and apparatus that effectively mix a beverage concentrate and diluting water.

Further, the present invention can provide a method and apparatus that provide a residence time for the pre-mixing of hot water and beverage concentrate.

The present invention can also provide a method and apparatus for sensing a sold out condition of a concentrate in a low pressure type system.

Moreover, the present invention can provide a method and apparatus for automatically controlling bacteria in a beverage dispensing system.

Still further, the present invention can provide a beverage mixing apparatus which is essentially a post-mix device but which has the appearance of a real brewer, such as a leaf tea brewer.

These and other aspects, objects, and features of the present invention will become apparent from the following detailed description of the preferred embodiments, read in conjunction with, and reference to, the accompanying drawings.

DETAILED DESCRIPTION OF THE PREFERRED EMBODIMENTS

Figure 1:
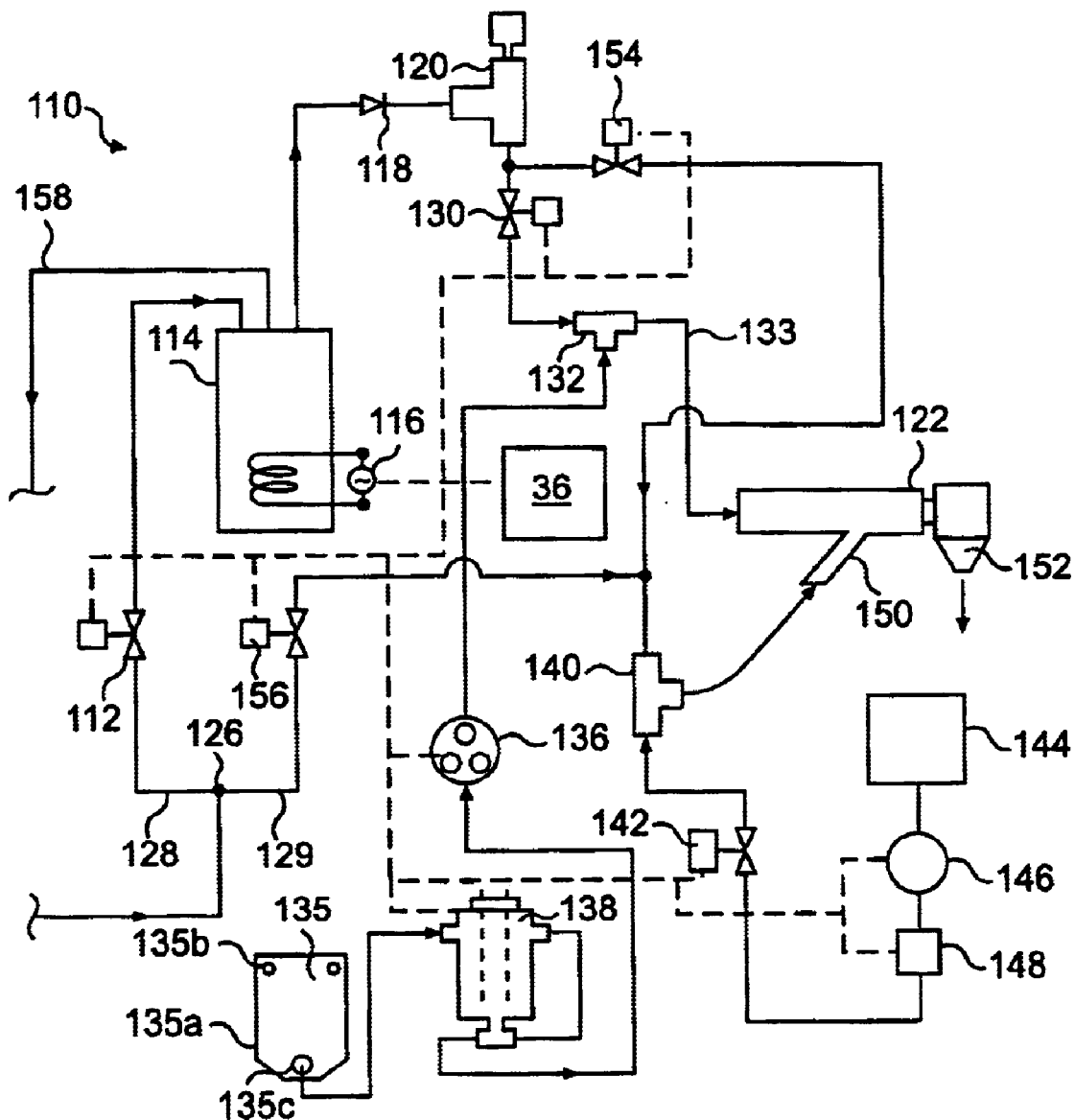
FIG. 1 is a block diagram of a beverage dispensing system according to an embodiment of the present invention.

The present invention relates to a beverage dispensing system that has the appearance of a system dispensing a beverage from a reservoir, but which is actually a post mix dispenser that instantaneously mixes and dispenses concentrate along with hot water and/or cold water.

In particular, the present invention relates to an iced tea dispenser that looks and operates like a real leaf tea brewing urn, but which is actually a post mix dispenser that instantaneously mixes and dispenses tea concentrate, hot water and cold water. An additive, such as a liquid sweetener, may also be mixed and dispensed with the other elements. The finished tea product looks and tastes like fresh brewed leaf tea, but without the disadvantages of high maintenance, high operational costs, and susceptibility to bacterial growth, which are inherent to leaf tea brewers. Additionally, the exterior of the dispenser appears to the user as a real leaf tea brewer.

An embodiment of the present invention will now be described with reference to FIG. 1. Throughout the system, conventional beverage tubing (FDA approved for use with food products) is used to connect the components of the system. Any of the beverage tubing lines may be insulated to prevent heat loss or gain. In the beverage dispenser system 110 shown in FIG. 1, a pressurized water source 124 supplies water to the system 110 at typical domestic water pressures, i.e., approximately 30–50 psi. A flow splitter 126 divides the water flow to provide a hot water heater inlet 128 and a cold water inlet 129.

The flow of the hot water heater inlet 128 is controlled by a hot water heater inlet flow control valve 112, which controls the flow of water into a water-heating tank 114. The hot water tank inlet flow control valve 112, as well as the other flow control valves in the system, can be a conventional beverage flow control valve, i.e., piston, sleeve and spring.

The tank 114 produces hot water within a predetermined range. The hot water is preferably in the range of 140–200° F., more preferably in the range of 175–185° F., and most preferably is 180° F. A temperature that is too high may cause the water to boil over and to flow out of the hot water tank. Additionally, during high volume dispensing, the temperature may drop to as low as 110° F. While this low temperature produces a product of lesser quality, it is still sufficient to produce the mixed beverage.

In this embodiment, a heating source 116, such as a heating element, is immersed in the tank 114. The heating source 116 is preferably a 750 watt heating element, which can support a dispensing rate of 17 gallons per hour. A thermostat (not shown) controls the heating element 116 to maintain the water temperature within the predetermined range discussed above.

It is also preferable for the tank 114 to contain a safety mechanism such as a temperature sensor (not shown) on the outside of the tank. The temperature as sensed by the temperature sensor on the outside of the water tank may be used in conjunction with a microprocessor to provide safety interlocks. For example, if the tank thermostat is set improperly, then it is possible to boil water in the tank, and the resulting escape of steam and hot water through the vent tube could cause a safety hazard. The temperature sensor provides a backup temperature reading and shuts down the heating source 116 if the temperature sensor detects a temperature that exceeds a predetermined value, such as the boiling point of the water. It is also preferable to provide insulation over the temperature sensor on the outside of the tank 114 to provide an accurate temperature reading.

An alternate approach is to use the temperature sensor in conjunction with a microprocessor to maintain the water temperature in the tank within the predetermined range discussed above. The thermostat is then employed as the safety mechanism to prevent overheating of water in the tank should there be a failure of the microprocessor/temperature control sensor.

When the tank is heated, there is a thermal lag between the temperature sensed on the outside of the tank and the actual water temperature in the tank. The greater the heat input rate, the greater the thermal lag. By reducing the heating rate from the heating element, the thermal lag will be reduced and the tank sensor will register more accurately. For example, the water heater may be fired at a reduced interval when the water approaches a high temperature. For example, above 165–180° F., depending on the heating capacity of the heater and the sensitivity of the temperature sensor, the heating element may heat 1 minute on and 1 minute off to reduce the effective heating rate by 50 percent. The reduced heating rate creates more temperature sensing accuracy and reliability. The temperature threshold and heating times can be varied to provide optimum performance. The safety relay may then be cut-out at a sensed temperature of for example 190° F. to prevent any possibility of boil over, and a warning message can be flashed to the user.

The tank 114 operates at atmospheric pressure, eliminating the need for an expensive vessel that can withstand high water pressure. The hot water inlet flow control valve 112 controls the flow rate of water into the tank 114. The incoming water enters the tank 114 at a controlled flow rate and pushes heated water out of the tank at the same flow rate. A check valve 118 positioned at the outlet of the tank prevents a gravity-fed back-flow of water into the tank when the incoming water flow is shut-off. Additionally, a vent tube 158 directs any overflow out of the tank 114. A preferred volume of the tank is 2.0 liters. The unpressurized operation of the system contributes to a normal flow of end product, causing the dispensed product to appear to be flowing from a reservoir, such as from a real leaf tea brewer.

Figure 2:
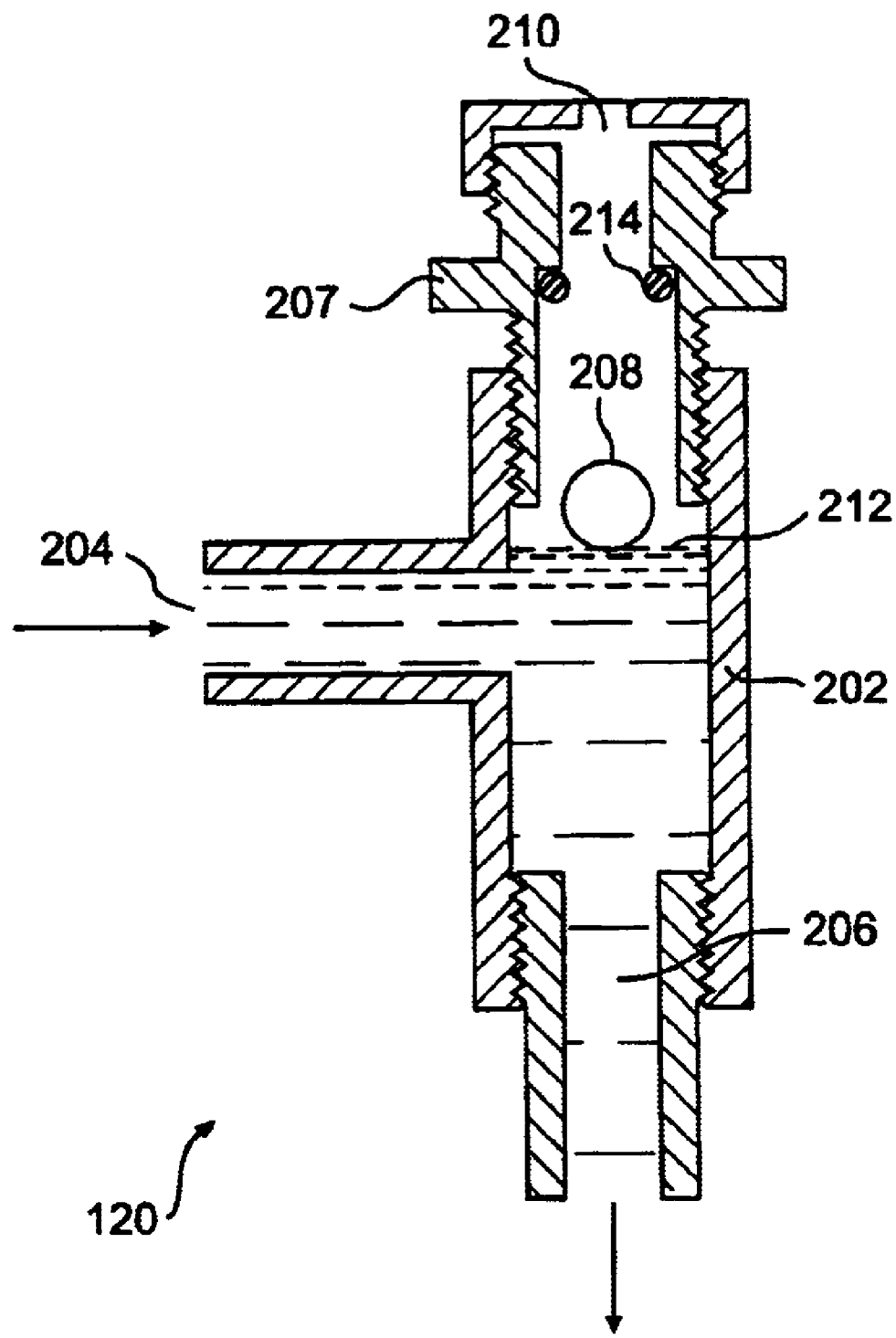
FIG. 2 is a sectional view of an air ejector assembly according to the present invention.

In normal use, the water entering the tank 114 may contain a large amount of dissolved air. As the water is heated, the dissolved air is released and large air bubbles rise to the tank outlet. The air bubbles disrupt the uniform water flow leaving the tank 114. To overcome this problem, the hot water leaving the tank 114 flows into an air ejector assembly 120, which will be described with reference to FIG. 2. The air ejector assembly 120 consists of a fluid chamber 202 where the incoming hot water enters through an inlet 204 and outgoing hot water exits through an outlet 206. The elevations of inlet 204 and outlet 206 may be the same, and air bubbles disengage from the water and rise to the top of the chamber 202. In a preferred embodiment, the outlet 206 is provided at a lower elevation in the chamber 202 than the elevation of the inlet 204, and most preferably, the outlet 206 is provided at the bottom of the fluid chamber 202. The difference in elevations between the inlet 204 and outlet 206 allows air bubbles to effectively disengage from the water and to rise to the top of the chamber 202. A check valve 207 utilizing a floating ball 208 is located at the top of the chamber 202. The ball 208 floats on the surface of the water. As the water level 212 rises within the chamber 202, the air above the water level is exhausted to the atmosphere through an exit opening or vent 210 in the check valve 207. If the water level 212 rises too high, the ball 208 pushes against a seal 214, such as an o-ring, that prevents the water from exiting the air ejector assembly 120. A retaining device (not shown) may be used to prevent the ball 208 from falling to the outlet 206 of the fluid chamber 202.

The air ejector assembly 120 (FIG. 1) is positioned above the hot water tank 114 and above mixing chamber assembly 122. The air ejector assembly 120 provides a constant pressure or "head" of hot water to the mixing chamber assembly 122. The constant pressure and the removal of air bubbles (that would otherwise provide an interruption in the flow) provide for a uniform flow of hot water to the mixing chamber assembly 122, resulting in a more homogenous beverage product being dispensed from the system. The flow restriction between the air ejector assembly and the mix chamber is set to balance with the liquid head in the air ejector at the desired hot flow rate. This is to ensure that a positive liquid level is maintained in the air ejector chamber and that air is not drawn from the air ejector and into the mix chamber.

A hot water flow control valve 130 controls the flow of hot water from the air ejector assembly 120. The hot water flows from the air ejector assembly 120 to a pre-mixing area 132, where the hot water is pre-mixed with beverage concentrate 135 in the internal plumbing upstream of the mixing chamber assembly 122. For dispensing a brewed iced tea beverage, the pre-mixing constitutes the "brewing" step.

The beverage concentrate 135 can be of any concentration ratio, with the mixing ratios of concentrate, hot water, and cold water being adjusted according to the specific concentration ratio. In a preferred embodiment, the beverage concentrate 135 is nominally a 100:1 dilution ratio based on volume, allowing storage of the highly concentrated beverage within a relatively small space. In the embodiment shown in FIG. 1, the beverage concentrate 135 is supplied in a disposable plastic bag 135a, which preferably contains two-liters of concentrate. Since the concentrate 135 is costly, it is beneficial to be able to fully evacuate the plastic bag 135a with little or no remnant, which requires proper support of the plastic bag 135a within the system 110. One method is to support the plastic bag 135a via a conventional "bag-in-box" approach. The preferred method is to hang the plastic bag 135a from hooks (not shown) attached to a support structure (not shown) of the system, which results in a more complete evacuation of the concentrate 135 from the plastic bag 135a. Eyelets 135b are provided in the upper perimeter of the plastic bag 135a to provide an attachment point for the hooks. An outlet fitting 135c is provided at the bottom of the plastic bag 135a, and the lower portion of plastic bag 135a is angled to the outlet fitting 135c. By hanging the plastic bag 135a, gravity pulls the beverage concentrate to the outlet fitting 135c. Tests of this method have shown excellent evacuation, with greater than 98 percent of the concentrate being dispensed before the plastic bag needs to be replaced.

The concentrate 135 is pumped by a pump 136 to the pre-mixing area 132, where the concentrate 135 is mixed with the hot water. The pump 136 is preferably a peristaltic pump, which is capable of pumping a metered amount of flow at the very low flow rates required for the beverage concentrate 135, typically less than 1 ml per second. Additionally, a "sold out" sensor 138, discussed below, detects when the plastic bag 135a needs to be replaced.

The concentrate 135 and the hot water are pre-mixed in the pre-mixing area 132 to form a pre-mixed solution. The pre-mixed solution flows through a "brewing" tube 133 to the mixing chamber assembly 122. The length of the "brewing" tube is adjusted to provide a desired residence time of hot water and concentrate. The desired residence time is preferably within the range of 0.0 to 2.0 seconds, and is more preferably about 0.5 seconds.

In the mixing chamber assembly 122, discussed below, the pre-mixed solution is mixed with cold water. The cold water flow control valve 156 controls the flow of the cold water. The cold water flows into the mixing chamber assembly 122 through a side port 150 where it is mixed with the pre-mixed solution, and the final beverage product is then dispensed through the nozzle 152.

A rinse valve 154 allows hot water to be flushed through mixing tee 140, inlet port 150, and mixing chamber assembly 122.

In this embodiment, an additive 144, such as liquid sweetener, can also be added to the mixing chamber 122. The sweetener is pumped by a pump 146 to a mixing tee 140, where it mixes with the cold water prior to entering the mixing chamber assembly 122. An additive flow control valve 142 controls the flow of the additive, and a sold out pressure switch 148 detects when the additive supply needs to be replenished. The pressure switch 148 can be a conventional pressure switch used in conventional post-mix systems. The amount of the additive can be controlled by adjusting the additive control valve 142. Additionally, an additive adjustment knob 162 (FIGS. 8 and 10) may be provided to allow easy adjustment of the additive amount.

In operation, a microprocessor (not shown) on a circuit board 36 activates the associated flow control valves, concentrate pump, and additive pump and starts the dispensing process. Additionally, transformers 168 (FIG. 8) provide power to the system.

In the preferred embodiment, the beverage concentrate is a highly concentrated tea extraction. In one example, the tea extraction should be mixed with water at a volume ratio of about 100:1 to achieve the optimal concentration. In order to activate certain flavor components and to effectively mix and dissolve the concentrate, this extraction should be mixed with hot water at a temperature in a range of around 140–200° F. At lower temperatures, the mixture may not remain in solution. In the preferred embodiment, the concentrate is first mixed with hot water at a ratio of about 20:1 and the hot water/concentrate mixture is then mixed with cold water at a ratio of about 4:1. Thus, the resulting beverage mixture will have a constituent ratio of cold water, hot water and concentrate of about 80:20:1.

The present invention is not limited to the exact configuration shown in FIG. 1. For example, the concentrate, hot water, cold water, and additive can all be pre-mixed prior to entering the mixing chamber, or any combination of these items can be pre-mixed prior to entering the mixing chamber. Additionally, all of these items can be separately introduced into the mixing chamber without any pre-mixing, or the items can be distributed directly to the dispensing nozzle 152 where they are simultaneously mixed and dispensed. When producing a brewed iced tea beverage, the additive, such as a liquid sweetener, is an optional item and is not required for producing the final brewed iced tea beverage. Additionally, an "on-demand" additive function can be added where the additive flow control valve 142 is controlled by the user pressing a button. This operation allows the user to choose whether to use the additive, for example, to choose whether sweetened or unsweetened tea is to be dispensed. Additional additives can also be added, if desired.

Figure 8:
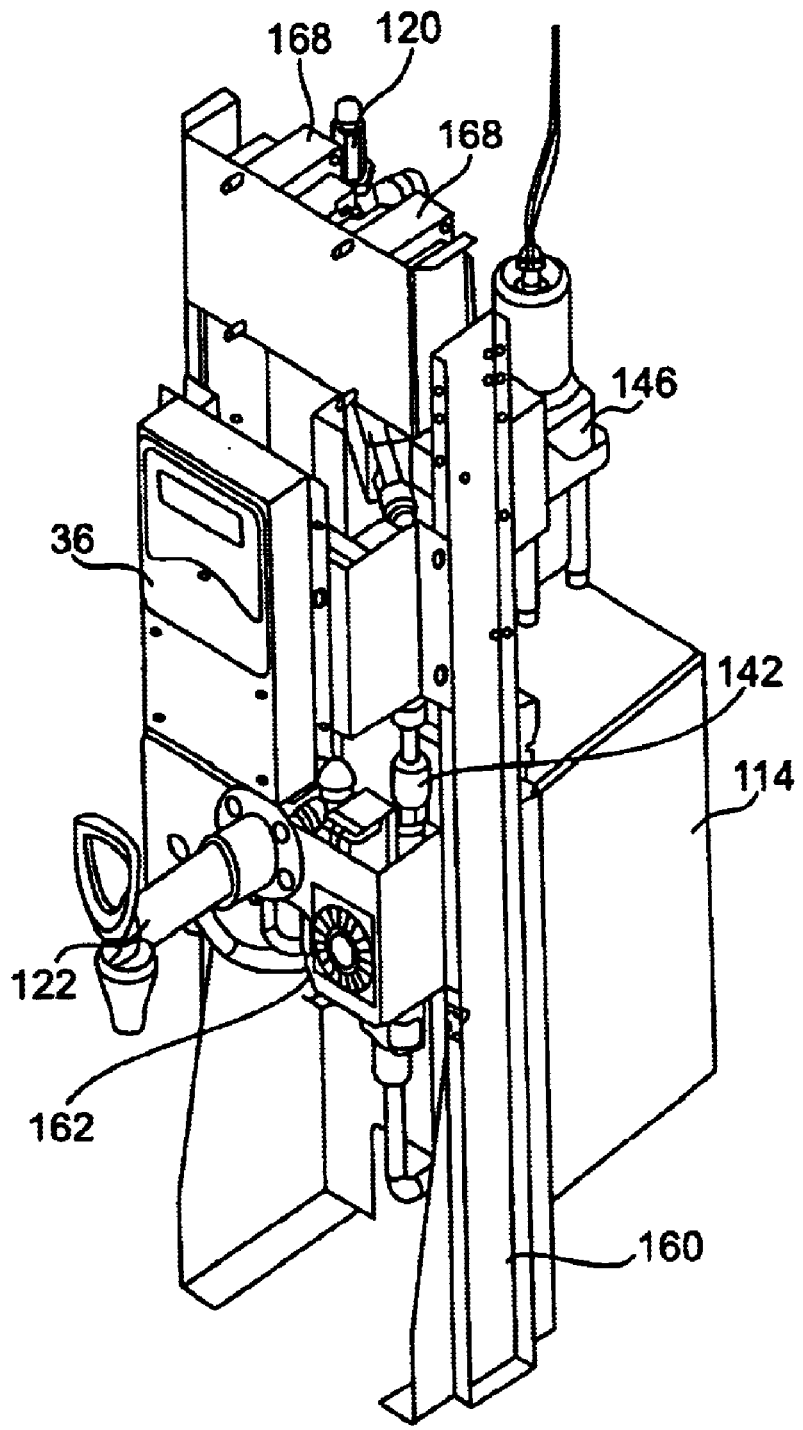
FIG. 8 is an assembly drawing showing an isometric view of a beverage dispenser according to the present invention.
Figure 9:
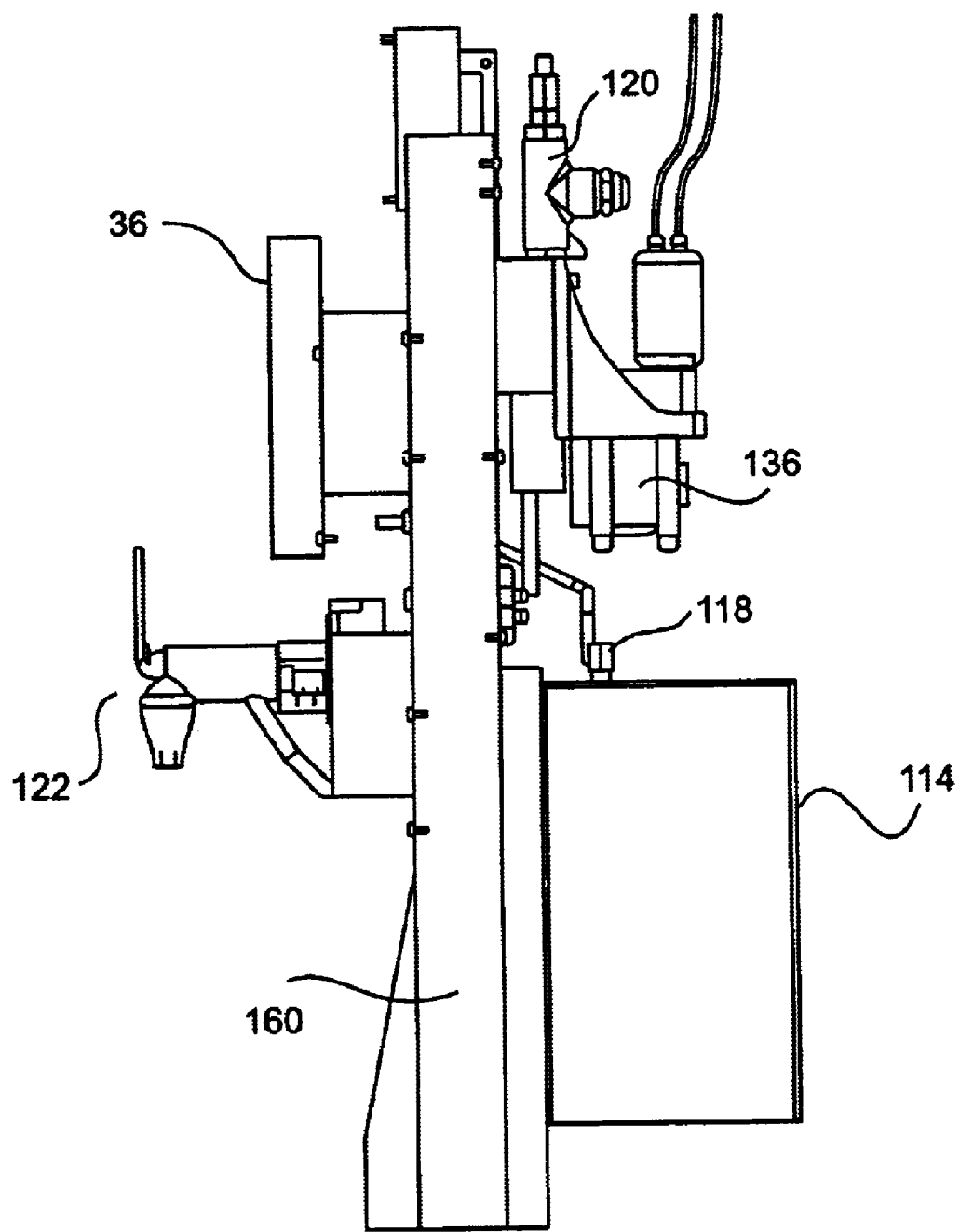
FIG. 9 is an assembly drawing showing a side view of a beverage dispenser according to the present invention.
Figure 10:
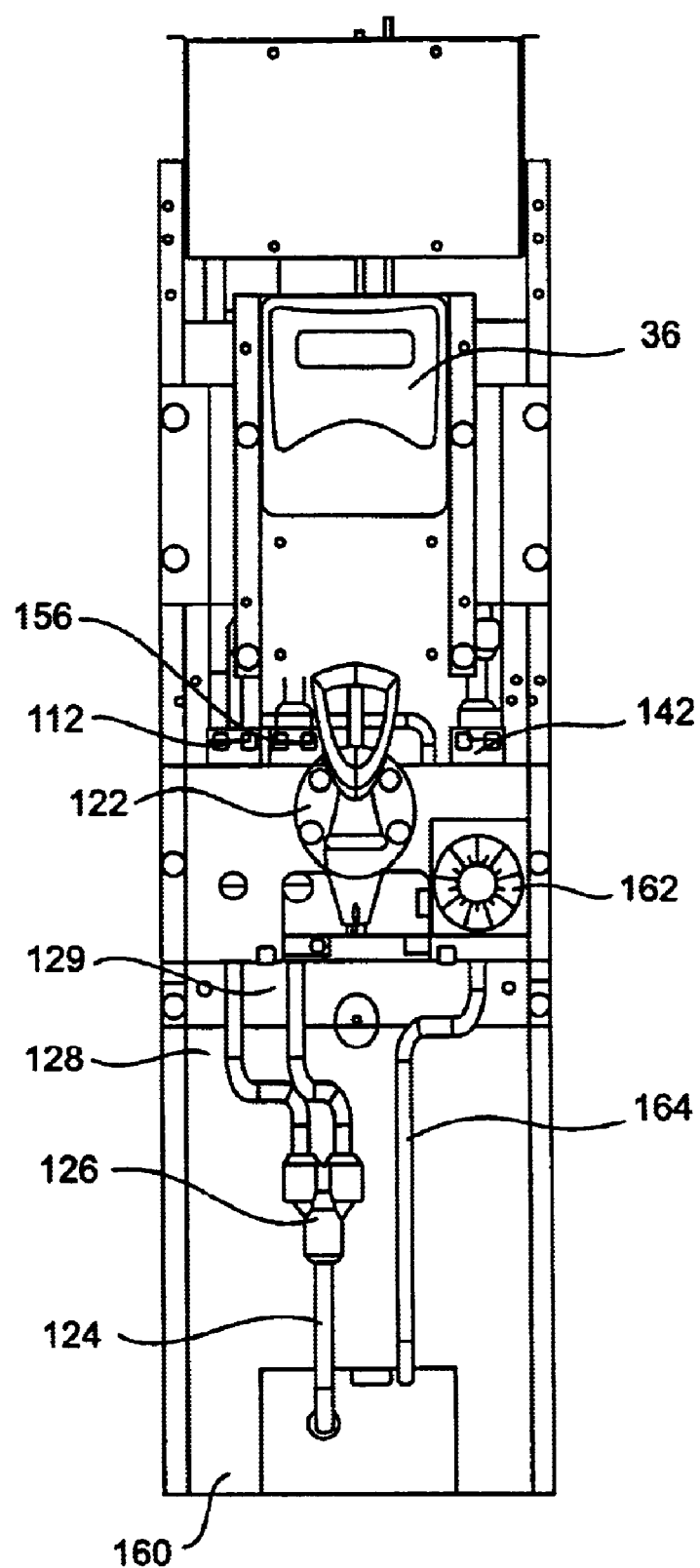
FIG. 10 is an assembly drawing showing a front view of a beverage dispenser according to the present invention.

FIGS. 8, 9, and 10 show assembly views of an operational embodiment of a beverage dispensing system according to the present invention. In these drawings, like reference numerals represent the same elements as in the other figures. A support structure 160 is provided for mounting the individual elements.

Figure 7:
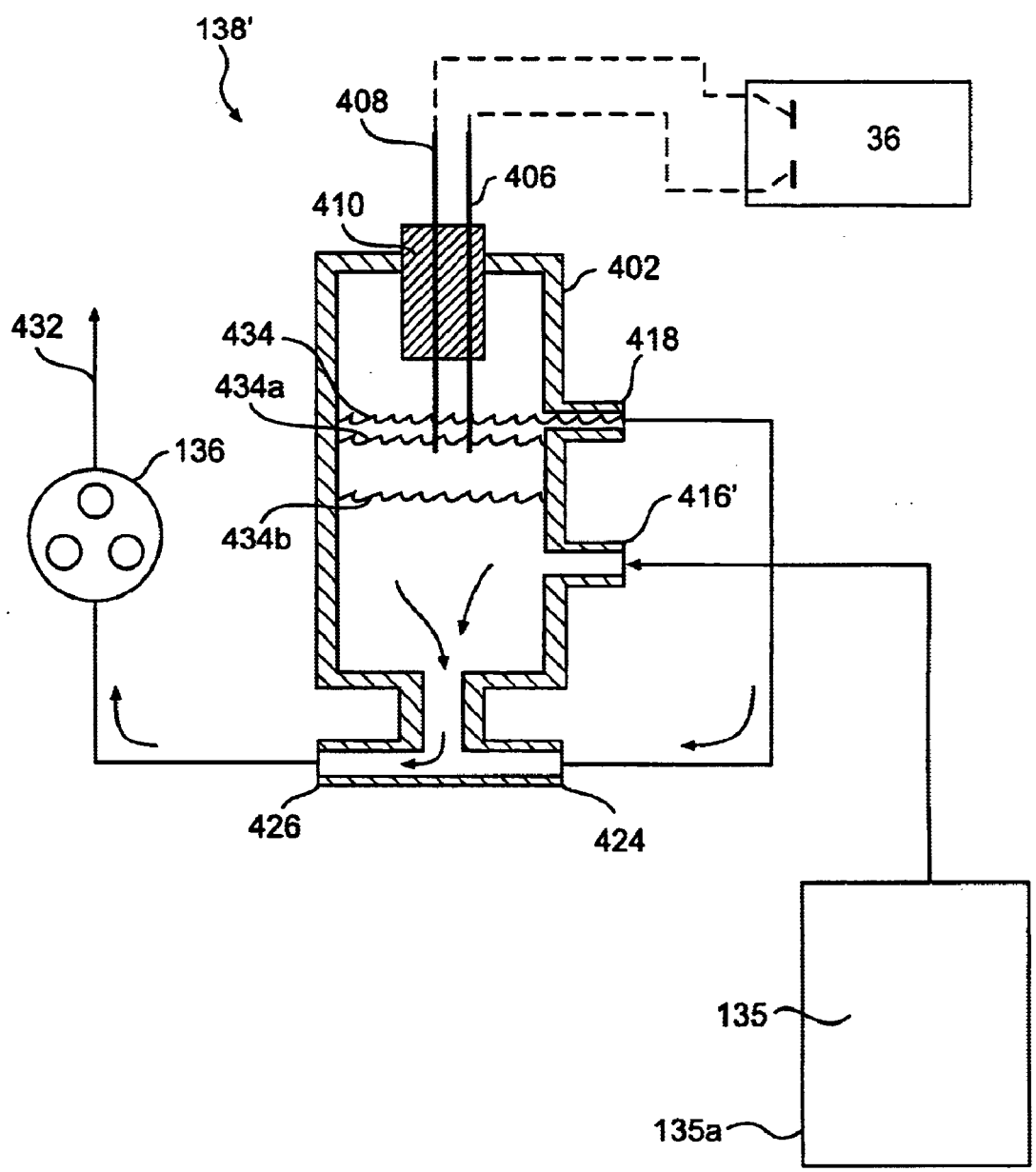
FIG. 7 is a drawing of an alternate sensor according to the present invention.
Figure 11:
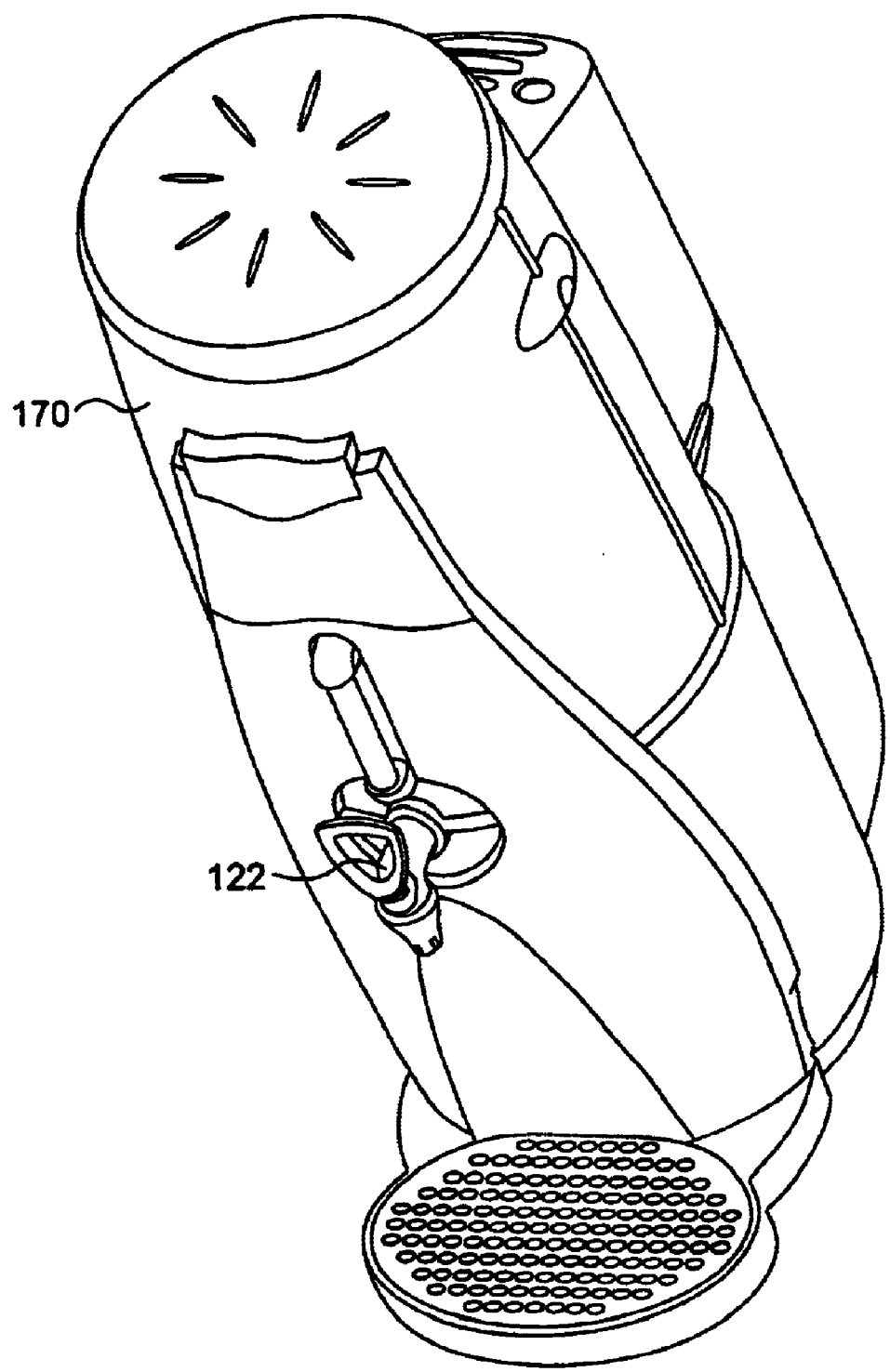
FIG. 11 is a conceptual view of the exterior cladding of a beverage dispenser according to the present invention.

FIG. 11 shows a conceptual design of exterior cladding 170 that provides the appearance of a real leaf tea brewer but which is actually a post-mix system according to the present invention. The exterior cladding 170 is attached to the support structure 160 (FIGS. 7–9).

The mixing chamber assembly 122 will now be described with reference to FIGS. 3 to 5. It is preferable that the mix chamber assembly 122 or "spigot" is perceived by the user as being a real beverage dispensing valve. However, the mixing chamber assembly 122 is not a conventional valve. It operates by automatically opening and closing the various flow control valves of the system.

Figure 3:
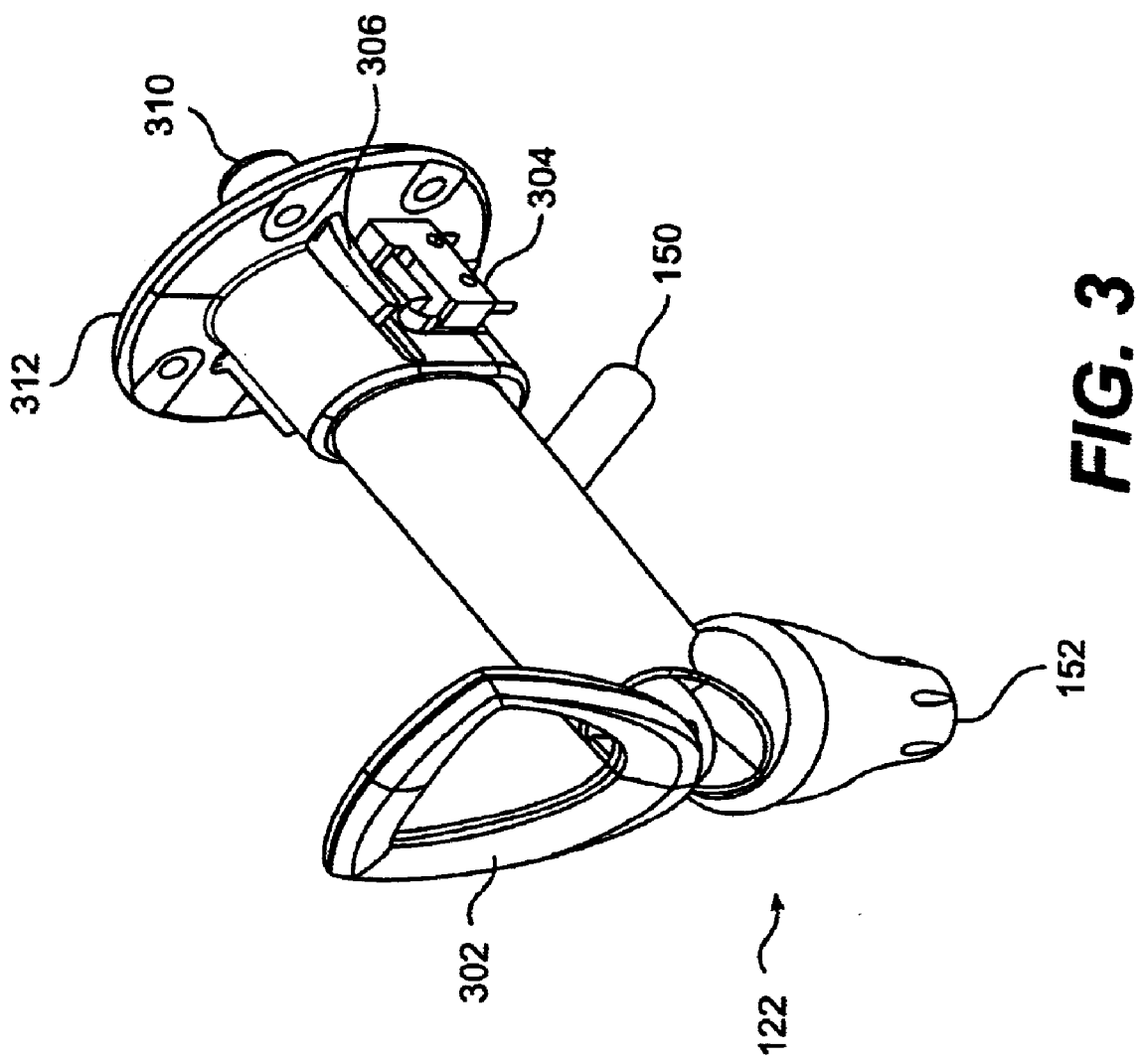
FIG. 3 is an isometric view of a mixing chamber assembly according to the present invention.
Figure 4:
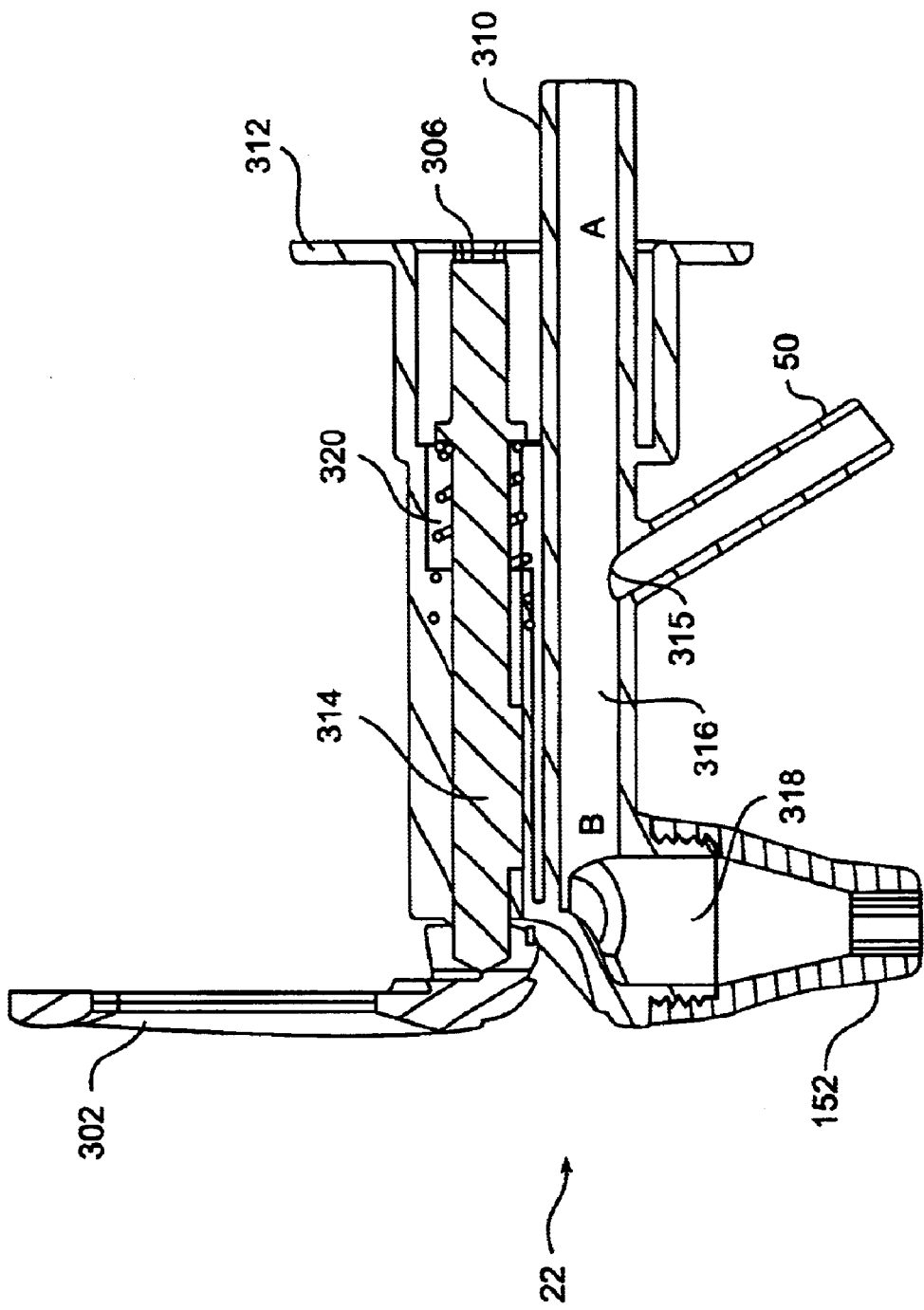
FIG. 4 is a sectional view of the mixing chamber assembly according to the present invention.
Figure 5:
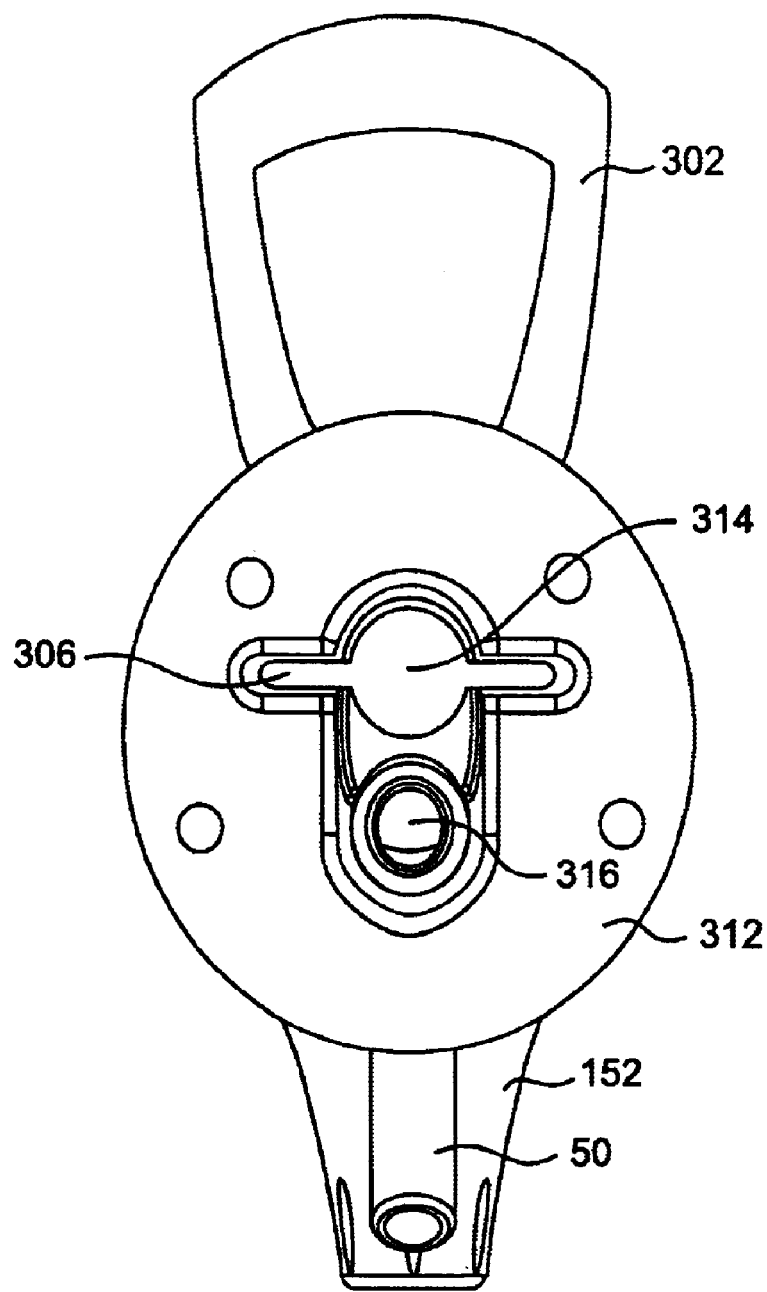
FIG. 5 is a rear view of the mixing chamber assembly according to the present invention.

FIGS. 3, 4, and 5 show an isometric view, a cross-sectional view, and a rear view, respectively, of the mixing chamber assembly 122. In these figures, like reference numbers represent the same items. The mixing chamber assembly 122 includes a lever 302, a nozzle 152, an additive/cold water inlet port 150, a microswitch 304, a switch depressor 306, a pre-mixed solution inlet 310, and a mounting flange 312. The user initiates the flow of beverage product by pulling on the lever 302. The lever 302 is linked to a pull rod 314 (FIGS. 4 and 5) that activates the microswitch 304 with the switch depressor 306. The lever 302 returns to the resting position by a biasing device or spring 320 (FIG. 4). The microswitch 304 is mounted to the rear of the of the mixing chamber assembly 122 and is hidden from the user.

Closure of the microswitch 304 creates an input to the microprocessor (not shown) on a circuit board 36 that in turn activates the associated flow control valves, concentrate pump, and additive pump, and starts the dispensing process. Alternatively, the microswitch 304 can directly activate the associated flow control valves, concentrate pump, and additive pump, and start the dispensing process.

Specifically, operating the lever 302 activates the microswitch 304. The microprocessor opens hot water valve 130 (see FIG. 1) and operates the pump 136 to provide hot water and concentrate to the mixing area 132, producing the pre-mixed solution. The microprocessor also opens the cold water flow control valve 156 and the additive flow control valve 142 to provide cold water and additive to the mixing tee 140. The pre-mixed solution and the cold water/additive mixture continue to the mixing chamber assembly 122 where the final product is dispensed through the nozzle assembly 152. When the lever 302 is returned to its resting position, the microswitch 304 is opened, and the microprocessor closes the flow control valves. The operation described above terminates the flow from the nozzle assembly 152 as soon as the lever 302 is returned to the resting position. Also, the operation of valve and pump activation and de-activation may be timed to make adjustments that could improve the homogeneity of the dispensed tea product.

As shown in FIG. 4, the pre-mixed solution inlet 310 and the additive/cold water inlet 150 connect to a mixing chamber 316. The mixing chamber 316 further mixes the beverage solution, and it is preferable for the mixing chamber 316 to have a gradually reducing hydraulic diameter from its entrance A to its exit B. The gradually reducing hydraulic diameter provides additional mixing of the beverage solution. Additionally, the mixing chamber 316 may have internal flow vanes (not shown) on the internal surface of, or inserted into, the mixing chamber 316 to further direct and mix the beverage solution.

At the exit B of the mixing chamber 316, the beverage solution empties into the nozzle chamber 318, where the flow direction is changed from horizontal to downward. The change in flow direction further enhances mixing. A converging nozzle 152 is threaded onto the nozzle chamber 318. Flow is directed through the nozzle 152 and into a cup or pitcher of the user. The nozzle 152 may have internal flow vanes (not shown) to help straighten the flow and minimize splashing. It is preferable for the nozzle 152 to be threaded onto the nozzle chamber 318 such that the threads are not exposed to the beverage product, making the system easier to clean.

The mixing chamber assembly 122 of the present invention is aesthetically appealing and looks like a "real" dispensing spigot, provides good mixing of the beverage product that produces a homogenous flow with no color variation due to incomplete mixing, and is drainable and cleanable with hot water to reduce the growth of bacteria. It is preferable to mold the mixing chamber assembly, or its components, with an antibacterial agent (for example, Microban™) mixed with the plastic resin to discourage the growth of bacteria on the internal and external surfaces.

The additive/cold water inlet port 150 is preferably angled in the flow direction, as shown in FIG. 4, to help maintain uniform flow. It is also preferable to provide a sanitary check valve 315 at the location where the additive/cold water inlet port 150 enters the mixing chamber 316. The sanitary check valve may be a rubber duckbill valve, for example.

If a separate additive port is provided in the mixing chamber assembly 122, then it is preferably located on the bottom of the mixing chamber 316. This positioning allows the additive to stratify during periods of non-dispense. Stratification is possible because the additive has a higher specific gravity than the beverage product. For example, a liquid sweetener has a higher specific gravity than a tea product. It is also desirable to keep the sweetener fully concentrated during periods of non-dispense to maintain the effectiveness of sterilizing agents in the sweetener.

The present invention is not limited to a dispensing device like the mixing chamber assembly discussed above. For example, the present invention encompasses a dispensing device where the hot water, cold water, concentrate, and the optional additive are mixed directly at the nozzle and then dispensed, without a mixing chamber. Additionally, the dispensing device could include separate inlet ports for each item (beverage concentrate, hot water, cold water, additive), and the items are then provided directly to the mixing chamber where they are mixed.

A programmable microprocessor (not shown) provides intelligent control of the system. The microprocessor controls the dispensing function (i.e., valve operation, pump operation, temperature control, etc.), monitors system status such as water temperature, number of drinks dispensed, out of product sensors (concentrate and additive), controls a daily hot water flush (discussed below) and sleep mode (discussed below), provides service diagnostics, and provides the ability to remotely poll the electronic status.

The preferred use of the beverage dispensing system is to produce a brewed iced tea beverage product. The "fresh brewed" process involves the pre-mixing of 100:1 tea concentrate with hot water in order to "brew" the tea. Dispensing flow rates of 2.5 ounces (74 ml) per second provide the look of iced tea dispensing from a real leaf tea brewer. For 100:1 concentrate, the system uses about 0.50 ounces (15 ml) per second of hot water, about 2.0 ounces (59 ml) per second of cold water, and about 0.03 ounces (1 ml) per second of concentrate. If an additive is also used, then the amount of cold water may be reduced accordingly.

Tea concentrate and hot water are pre-mixed in the mixing area. The pre-mixed tea concentrate/hot water solution is then mixed in the mixing chamber assembly with a metered quantity of cold water to produce the finished tea beverage. The cold water reduces the temperature of the final product to a temperature that is similar in temperature to the iced tea product dispensed from leaf tea brewers. Preferably, the temperature of the dispensed tea product is within the range of 60–100° F., and more preferably within the range of 70–90° F. The dispensed tea product should be dispensed into a cup containing ice, to produce an iced tea beverage. A sweetened tea option is also provided, where a liquid sweetener (the additive) is added to the pre-mixed solution. The liquid sweetener may be added directly to the pre-mixed solution in the mixing chamber, or, preferably, it is mixed with the cold water and then with the pre-mixed solution.

Two beverage dispensing systems may also be provided together, where one system produces sweetened tea including the liquid sweetener additive and the other system produces unsweetened tea without the additive. A dual-spigot dispenser incorporating this concept in an integral apparatus will be described later in a second embodiment.

The "fresh brewing" process results in a superior product in terms of taste, clarity, convenience and economy. There is also a distinct advantage with respect to controlling the unwanted growth of bacteria as compared to conventional leaf tea brewers where bacteria are not easily controlled.

Operation of the sold out sensor 138 (FIG. 1) will now be described with reference to FIG. 6. Once the concentrate 135 (FIG. 1) is depleted, i.e., the plastic bag 135a is empty or nearly empty, there is a need to provide the operator with a "sold out" indication to prevent further operation of the system. The sold out sensor ensures that only a quality finished beverage is dispensed. Otherwise there is a risk that the dispensed drink will be weak in concentrate, and that the customer will not be satisfied.

In the present invention, the conductive properties of the concentrate are used to detect a sold out condition. A low voltage potential is applied across two electrodes immersed in the concentrate. A control circuit is used to monitor the impedance across the electrodes and thereby sense when the electrodes are immersed in concentrate and when an air gap exists between the electrodes (as when the concentrate supply is depleted).

Beverage concentrates, particularly a tea concentrate, are highly viscous. Although an air gap may exist between the electrodes when the concentrate is sold out, the viscosity causes a thin film of concentrate to accumulate on the electrodes and internal surfaces of the electrode chamber. Being electrically conductive, the film may create a current leakage pathway between the electrodes and prevent the circuit from accurately detecting the sold out condition. Additionally, small air bubbles are also drawn from the concentrate bag and into the suction tubing when the bag is nearly empty. However, the bubbles may not be large enough to cause a sizable air gap between the electrodes. If not removed, these bubbles will cause a reduction in the flow of tea concentrate to the mixing chamber assembly and in the dispensed tea strength before the sold out condition can be detected. The present invention overcomes these two problems by reliably sensing the depletion of concentrate as the bag nears depletion without any reduction in dispensed product strength.

Figure 6:
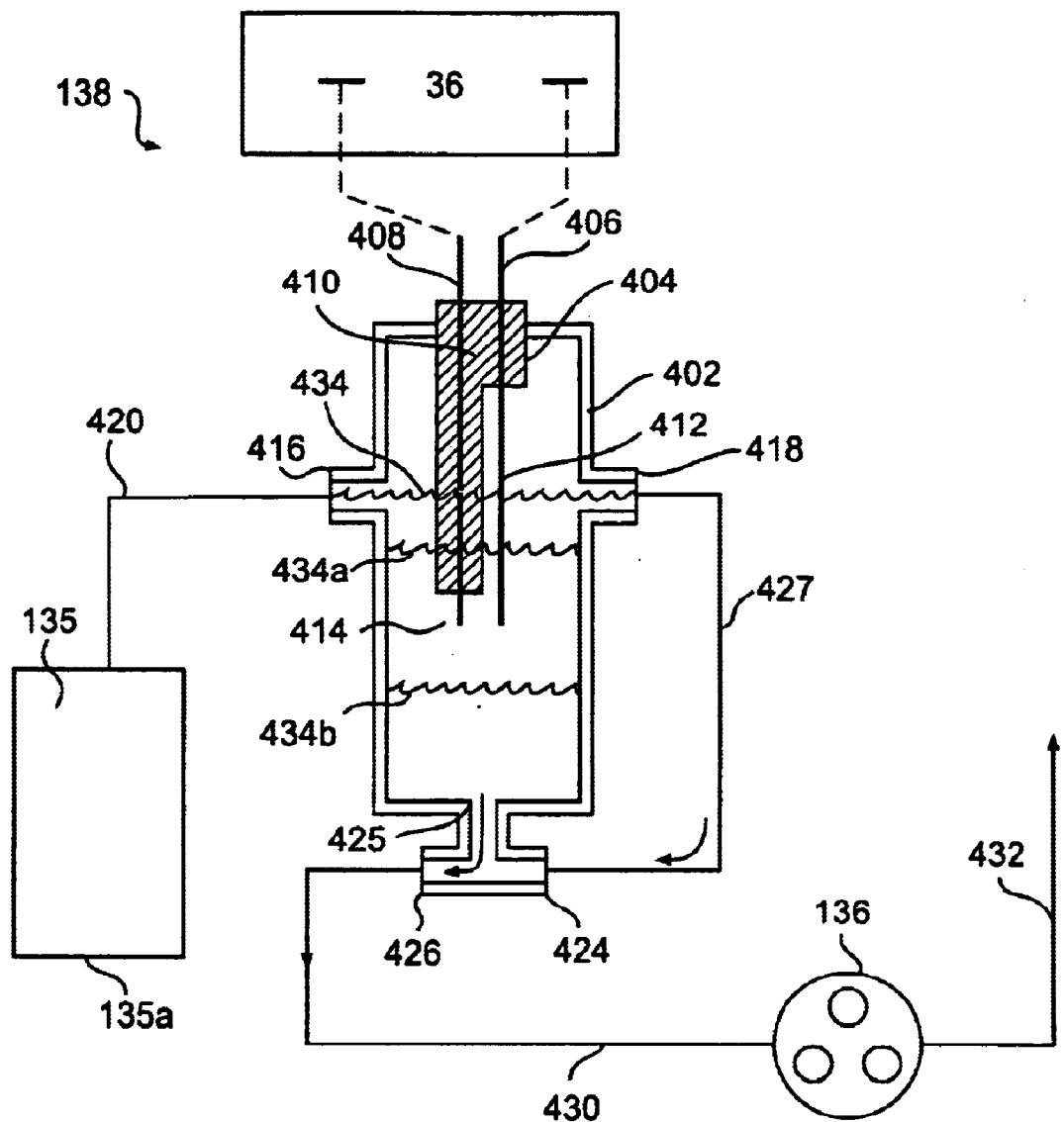
FIG. 6 is a drawing of a sensor according to the present invention.

As shown in FIG. 6, the sold out sensor 138 includes a cylindrical chamber 402 housing an electrode assembly 404 such that the long axis of the chamber is vertical. Electrode assembly 404 is secured into the top of chamber 402 by suitable means (not shown) such as pipe threads. The electrode assembly consists of electrodes 406 and 408 potted within a dielectric material 410 (e.g., injection-molded plastic). The dielectric material 410 provides electrical isolation of the electrodes. Both electrodes extend beyond the bottom portion of the dielectric material so as to expose the ends of the electrodes. Electrode 406 has a longer exposed portion 412 than the exposed portion 414 of electrode 408.

The bottom ends of both electrodes extend below ports 416 and 418. Port 416 is an inlet port and connects to the concentrate bag 135a via tubing 420. Port 418 is an equalizing port and connects to port 424 via external equalizing tube or line 427. Port 425 is an exit port from the bottom of chamber 402. Port 426 is an outlet port and connects to the pump 136 via tubing 430. The pump discharges concentrate through tubing 432 to the mixing area (not shown).

In operation, a normal liquid level 434 is maintained in the chamber 402. Liquid level 434 corresponds to the level of inlet port 416 and equalizing port 418. Pump 136 draws concentrate out of the concentrate bag 135a and into the chamber 402 through port 416. Concentrate is drawn out of the chamber 402 primarily through ports 425 and 426 and into the suction tube 430 of the pump 136. A small portion of the concentrate may also be drawn out of the chamber 402 through port 418 via equalizer line 427. Flow is induced by suction pressure produced by the pump 136 in line 430.

As long as the bottom of electrodes 406 and 408 are immersed below the liquid level 434, the control circuit 36 senses that there is concentrate in the chamber. As the concentrate bag 135a nears depletion, small air bubbles will start to flow out of the bag 135a and into the chamber 402. The bubbles will then separate from the concentrate and rise to the top of the chamber 402, and the liquid level 434 may start to fall, as indicated by level 434*a*. While this is happening, concentrate is still delivered bubble free to the mixing chamber because the pump 136 draws concentrate from the bottom of the chamber 402 through port 426.

In theory, air could be drawn to the pump 136 via equalizing tube 427. However, the surface tension of the concentrate within equalizing line 427 creates a resistance to flow, which prevents air from entering the equalizing line 427. The surface tension is a result of the viscosity of the concentrate.

Once the liquid level falls below the bottom of the electrodes, an increased electrical impedance between the electrodes is sensed by circuit board 36, which prevents further dispensing and activates a warning light to the user.

When the liquid level drops to below the bottom of the electrodes, a thin film of concentrate may remain on that portion of the electrodes and dielectric material that was previously submersed. However, concentrate film does not accumulate on the upper portion of the exposed portion 412 of electrode 406, because the upper portion is above the normal liquid level 434. The present invention prevents an electrically conductive thin film from forming, which might otherwise create an electrical pathway between the electrodes and cause the sold out system to malfunction. Thus, circuit board 36 can sense when the liquid level in the chamber 402 drops below the bottom of the electrodes 406 and 408 and can reliably activate the sold out function. Upon activation of the sold out condition, the liquid level in the equalizer line 427 falls to the same liquid level 434*b* as in the chamber 402.

Once the empty concentrate bag is replaced, the chamber 402 must be primed by the pump 136 to remove the built-up air. A priming function is provided for the control board 36 to operate the pump 136 at a high speed to speed up the priming process. While priming, the pump 136 causes a low pressure in the chamber 402 and connecting tubing 420 and 430. Concentrate is drawn out of the new concentrate bag 135*a* and into the chamber 402 through port 416. The concentrate starts to fill the chamber 402 because it flows into the chamber 402 faster than it can be drawn out through exit port 425 at the bottom of the chamber. The reduced liquid level in the equalizer line 427 results in a reduced flow restriction, thereby allowing air to be drawn and removed from the upper portion of the chamber through the equalizer line 427.

During normal operation, the equalizer line 427 imparts a high restriction to prevent flow of air therethrough. The equalizer line 427 must have a small enough diameter so that surface tension causes the fluid to block the equalizer line 427. With the equalizer line 427 effectively blocked, any air that accumulates in the upper chamber will cause the liquid level 434 to fall, facilitating the sensing of a sold out condition.

The opposing processes of detecting a sold out condition and priming the chamber may require balancing the restrictions imparted by the equalizer line 427 and exit port 425 for optimal performance and for fluids of varying viscosity. The relative level of restriction imparted by exit port 425 and equalizer line 427 can impact the effectiveness of the air removal process. For example, if exit port 425 is too large, then the chamber may not prime easily. The fluid viscosity may also impact the ability to prime the chamber. A low viscosity fluid may require exit port 425 to be made more restrictive to facilitate the priming process. Additionally, the probes 406 and 408 should be lengthened for lower viscosity fluids.

An alternate sold-out sensor 138' is shown in FIG. 7. This alternate sensor differs from the first-described sensor primarily in the placement of inlet port 416'. In this alternate arrangement, the inlet port 416' is positioned at a level below the bottom tips of electrodes 406, 408 and below equalizing port 418. Although the first-described sensor 138 is very accurate in sensing fluid depletion from the bag, it still is not completely accurate. When fluid bag 135*a* is emptied, gas bubbles were drawn through inlet port 416 at the same elevation as the electrodes. These bubbles could sometimes bridge the electrodes while fluid in chamber 402 was emptying. If the fluid was viscous enough, the chamber could empty before a sold-out indication was registered.

In this alternative sensor, because inlet port 416' is below the electrodes, the bubbles break the fluid surface in chamber 402, but are quickly broken apart and do not bridge the electrodes. Because inlet port 416' is positioned below equalizing port 418, it is believed that some of the bubbles that enter chamber 402 are suctioned to destruction by air drawn through the equalizing port 418.

The beverage dispensing system according to the present invention also includes microbiological control features to minimize bacterial growth. The present invention is effectively a post-mix device, and there is minimal mixed product volume stored in the internal flow passages, which minimizes the probability of bacteria growth. The present invention also minimizes bacteria growth by providing 1) a self-cleaning function for flushing the internal flow passages with hot water, and 2) an automatic drain function to drain the internal flow passages during a prolonged period of non use.

The operating water temperature of about 160–180° F. is hot enough to kill bacteria. Hot water from the hot water tank is available to flush through the mix chamber, premix tubing, cold water tubing, and additive tubing. The internal plumbing is designed to accommodate flushing of these internal passages using appropriate tees and solenoid valves. The microprocessor requires that the operator perform the hot water flush procedure at predetermined intervals, preferably at least once per day. The flush sequence results in the internal passages being subjected to high temperatures for sufficient duration to kill bacteria, preferably greater than 160° F. for 5 minutes. A preferred method for flushing the system is described below, but any method of automatically flushing the system with hot water to kill bacteria is sufficient.

In the preferred flushing method, hot water tank inlet flow control valve 112 (FIG. 1) and rinse valve 154 are opened for 10 seconds, and hot water flows through rinse valve 154, mixing tee 140, inlet port 150, and the mixing chamber assembly 122. After a 90 second wait period, hot water tank inlet flow control valve 112 and hot water valve 130 are opened for 10 seconds, and hot water flows through the hot water valve 130, mixing tee 132, and the mixing chamber 122. Then, an 80-second wait period begins. The last two steps may be repeated, preferably for a total of three operations. This process maintains the temperature of the system above 160° F. during the flushing process, which kills bacteria in the system.

Figure 12:
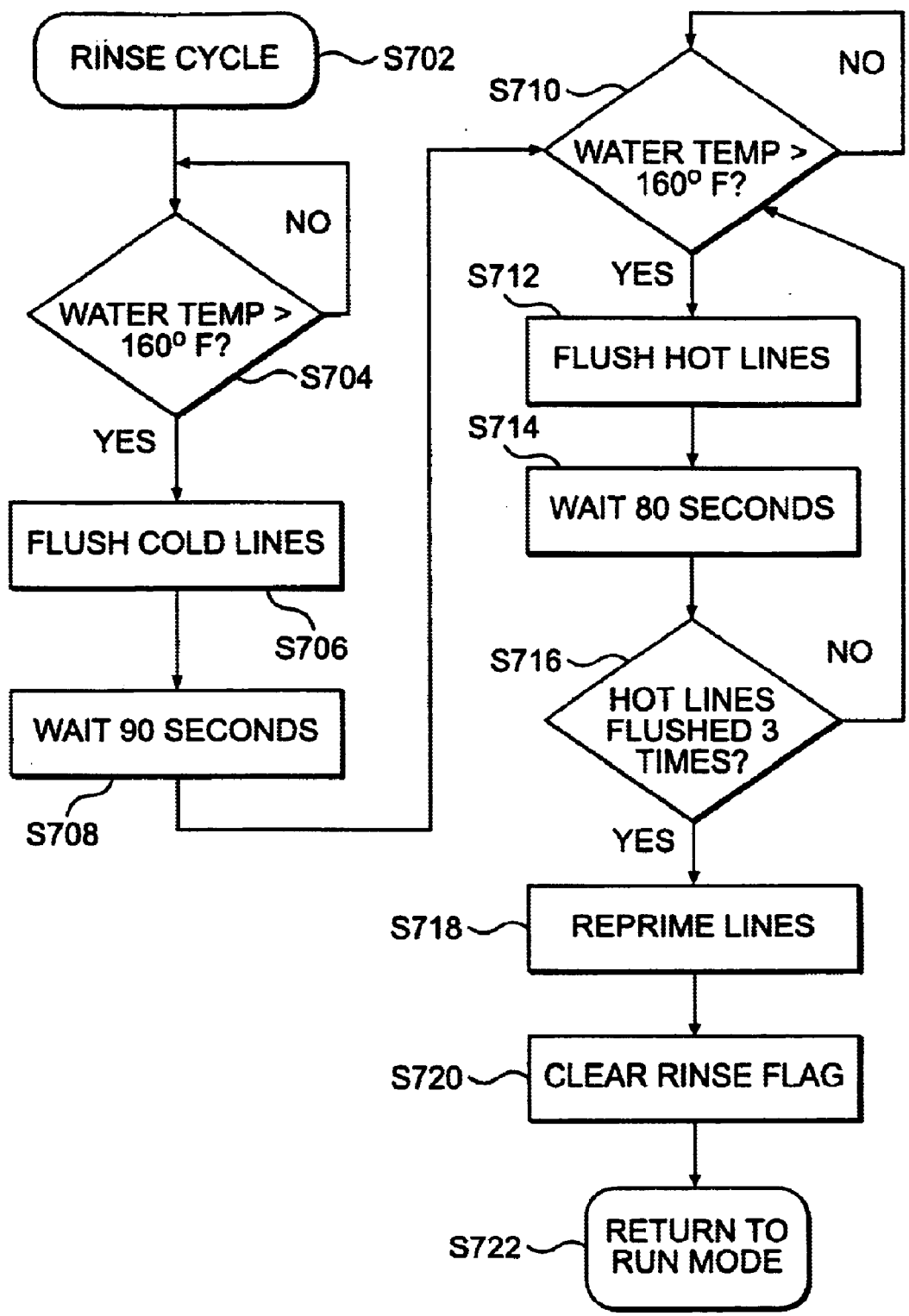
FIG. 12 is a flow chart showing a method of automatically flushing a beverage dispenser.

FIG. 12 is a flow chart showing logic for performing the flushing method described above. The process enters the Rinse Cycle in Step S702. In Step S704, it is determined whether the temperature of the hot water is greater than 160° F., as measured by the hot water tank sensor. If it is not, then Step S704 is repeated. If the temperature is greater than 160° F., then the cold lines are flushed with hot water for 10 seconds, Step S706. A 90 second wait period is then performed, Step S708.

In Step S710, it is again determined whether the temperature of the hot water is greater than 160° F. If it is not, then Step S710 is repeated. If the temperature is greater than 160° F., then the hot lines are flushed with hot water for 10 seconds, Step S712, and then an 80 second wait period is performed, Step S714. In Step S716, it is determined if the hot lines have been flushed three times. If not, then the process returns to Step S710. If the hot lines have been flushed three times, then a five second product pour is performed to reprime the lines, Step S718, the Rinse Flag is cleared from the microprocessor, Step S720, and the system returns to the normal run mode, Step S722.

An auto drain or "sleep" feature automatically drains the system of the present invention at a predetermined interval. The microprocessor monitors the time since the most recent dispense. If this inactive period exceeds a predetermined period, for example, 4 hours (or other selectable duration), then the microprocessor initiates the auto drain function. Auto drain starts by opening the hot water valve 130 (FIG. 1), which allows water contained in the air ejector assembly 120 to gravity drain into the mixing chamber assembly 122 and out the dispensing nozzle 152. A total liquid volume of approximately 1.0 ounces is dispensed into a drip tray (not shown) from the nozzle. The auto drain feature may also clean out the cold water and sweetener lines by opening the cold water flow control valve 156 to flush the mixing tee 140 and the inlet port 150 prior to draining the air ejector assembly 120.

The auto drain empties the mixing chamber assembly 122 and the brewing tube 133, thereby removing the "food" that sustains bacteria. The growth of bacteria is inhibited and localized along the surfaces of the internal passages. Furthermore, the effectiveness of the anti-bacterial composition of the mixing chamber assembly 122 is greatly increased, since the anti-bacterial products are most effective in controlling surface bacterial growth.

Microbiological testing has shown that the in-place hot water flush and auto drain features greatly reduce or eliminate bacterial growth within the product flow passages.

The present invention may also include a fail safe start-up mode to ensure the hot water tank 114 (FIG. 1) contains water before the heating operation begins. This start-up mode is controlled by the programmable microprocessor and involves evaluating the temperature increase rate in the hot water tank. The temperature increase rate in the tank is approximately 3 times greater with air in the tank than with water in the tank, as measured by the tank sensor on the outside of the tank. The microprocessor monitors the temperature increase rate for a predetermined time on start-up. The data is then compared to a known temperature increase rate for the tank containing water. If the monitored rate is too high, the microprocessor shuts down the system and alerts the operator to the condition.

The disclosed beverage system provides a brewed iced tea product through its hot brewing step by pre-mixing special, highly concentrated tea syrup with hot water. After sufficient residence time of about 0.50 seconds, the hot tea solution is further mixed with cold water and optional liquid sweetener. This process results in a clear tea product that looks and tastes like fresh brewed tea. The brewing and mixing steps occur instantaneously or "on-demand" in the fashion of post-mix and with precise portion control of the constituents. There is minimal storage of mixed tea product in the system's internal passages, which are also self-cleanable using available hot water. These features make the system much less susceptible to dangerous bacteria growth.

The end user is led to believe that the product is freshly brewed iced tea from a real leaf tea brewer. Maintenance and operational costs to the end user are greatly reduced, the exterior appearance is modern and pleasant, and convenience is enhanced.

In a second embodiment, the present invention relates to a an iced tea dispenser that looks and operates like a dual spigot real leaf tea brewing urn, but which is actually a post mix dispenser that instantaneously mixes and dispenses tea concentrates, hot water and cold water. An additive, such as a liquid sweetener, may also be mixed and dispensed with the other elements. One spigot can be used to dispense a sweetened product, while the other spigot can dispense an unsweetened product. Additionally, the exterior of the dispenser appears to the user as a real leaf tea brewer with two side-by-side urns.

The second embodiment differs from the first embodiment primarily in that two mixing chambers, two hot water control valves and two syrup pumps are provided corresponding to each of the two spigots, but a single concentrate source, hot water heater, air ejector and sold-out sensor are provided.

Figure 13:
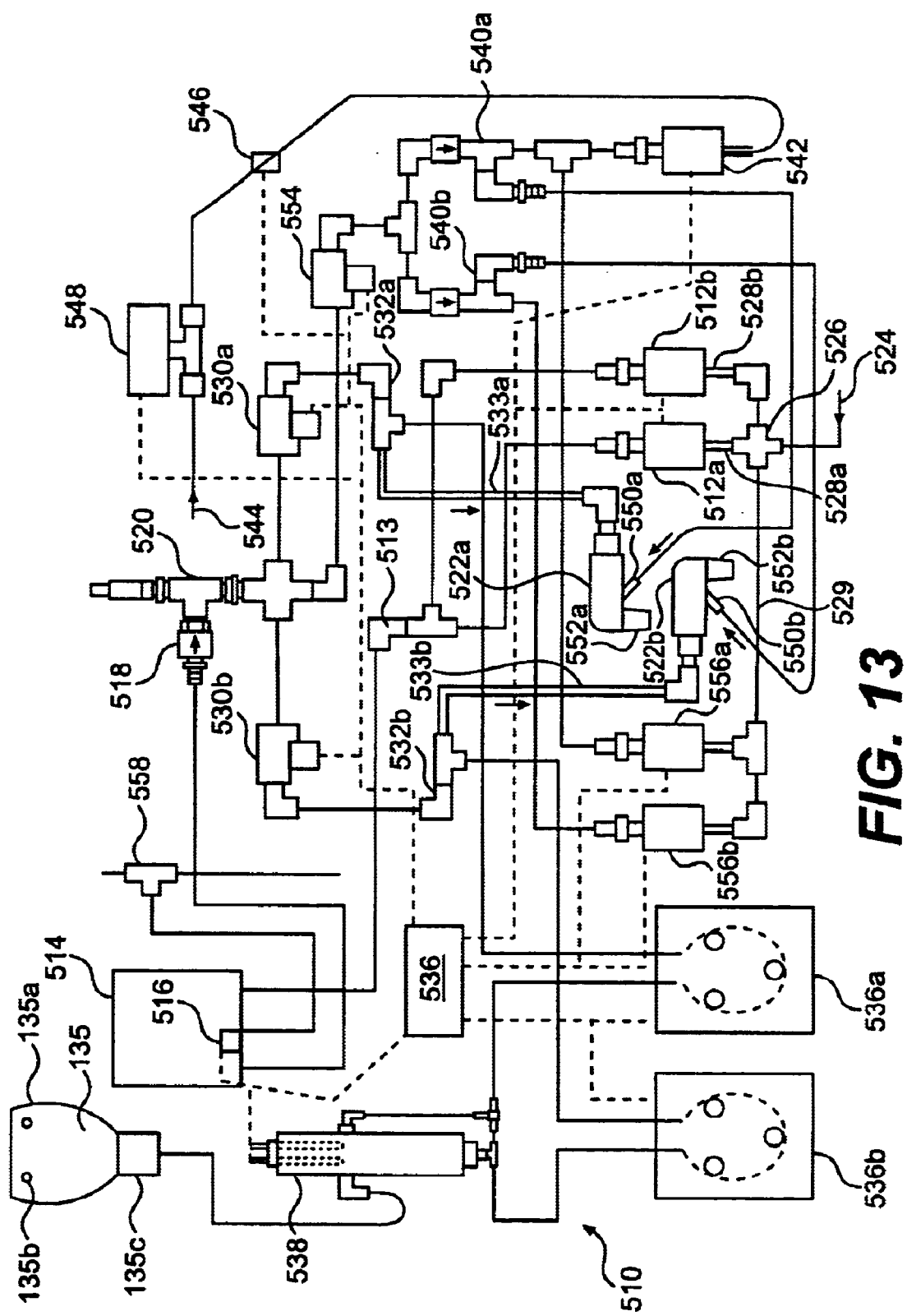
FIG. 13 is a block diagram of a beverage dispensing system according to a second embodiment of the present invention.
Figure 14:
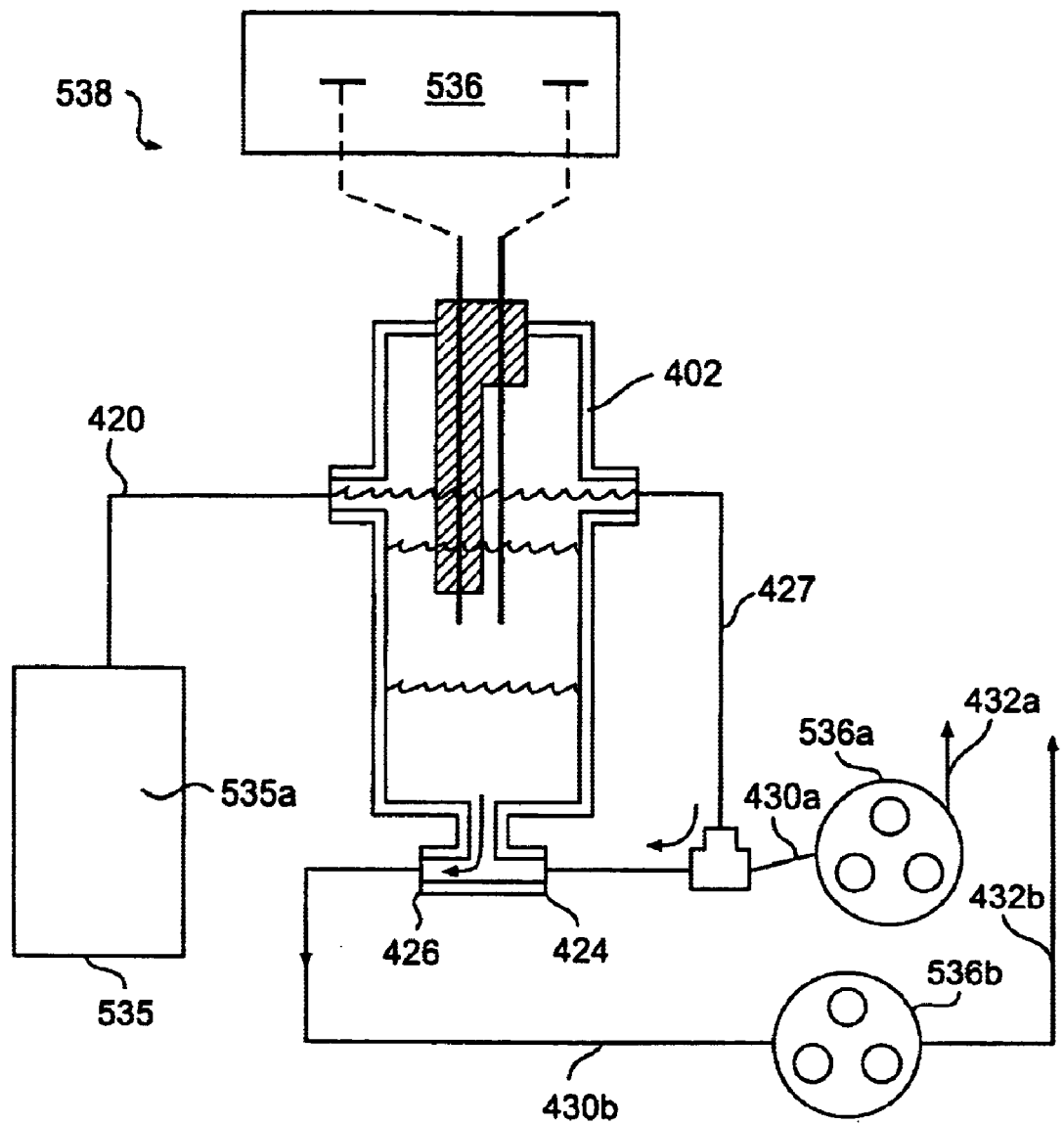
FIG. 14 is a drawing of a sensor for the second embodiment of the present invention.

The second embodiment of the present invention will now be described with reference to FIGS. 13–15. In the beverage dispenser system 510 shown in FIG. 13, a pressurized water source 524 supplies water to the system 510 at typical domestic water pressures, i.e., approximately 30–50 psi. A flow splitter 526 divides the water flow to provide hot water heater inlets 528a, 528b and a cold water inlet 529.

The flows of the hot water heater inlets 528a, 528b are controlled by hot water heater inlet flow control valves 512a, 512b, which control the flow of water into a single water-heating tank 514. The hot water tank inlet flow control valves 512a, 512b, as well as the other flow control valves in the system, can each be a conventional beverage flow control valve, i.e., piston, sleeve and spring. The flows from hot water inlets 528a, 528b are combined at tee 513 before entering tank 514.

The tank 514 produces hot water within a predetermined range. The hot water is preferably in the range of 140–200° F., is more preferably in the range of 175–185° F., and most preferably is 180° F. A temperature that is too high may cause the water to boil over and to flow out of the hot water tank. Additionally, during high volume dispensing, the temperature may drop to as low as 110° F. While this low temperature produces a product of lesser quality, it is still sufficient to produce the mixed beverage.

In this embodiment, a heating source 516, such as a heating element, is immersed in the tank 514. The heating source 516 is preferably a 1300 watt heating element, which can support a dispensing rate of about 28 gallons of finished tea product per hour. A thermostat (not shown) controls the heating element 516 to maintain the water temperature within the predetermined range discussed above.

The tank 514 operates at atmospheric pressure, eliminating the need for an expensive vessel that can withstand high water pressure. The hot water inlet flow control valves 512a, 512b control the flow rates of water into the tank 514. If both spigots are actuated, the required flow rate is higher than if only one spigot is actuated. Accordingly, if one spigot is actuated, a corresponding one of hot water inlet flow control valves 512a, 512b is opened, and if both spigots are actuated, both inlet valves are opened. The incoming water enters the tank 514 at the controlled flow rates and pushes heated water out of the tank at the same flow rates. A check valve 518 positioned at the outlet of the tank prevents a gravity-fed back-flow of water into the tank when the incoming water flow is shut-off. Additionally, a vent or overflow tube 558 directs any overflow out of the tank 514. The purpose of the overflow tube is to equalize the tank pressure with atmospheric pressure and to provide relief for the thermal expansion of the water as it is heated. A preferred volume of the tank is 2.0 liters. The unpressurized operation of the system contributes to a metered and uniform flow of end product, causing the dispensed product to appear to be flowing from a reservoir, such as from a real leaf tea brewer.

The air ejector assembly 520 (FIG. 13) is positioned above the hot water tank 514 and above mixing chamber assemblies 522a, 522b. The air ejector assembly 520 provides a constant pressure or "static head" of hot water to each mixing chamber assembly 522a and 522b as a result of the substantially constant height of the liquid column maintained between the air ejector and the mixing chamber assembly. The constant pressure and the removal of air bubbles (that would otherwise provide an interruption in the flow) provide for a uniform flow of hot water to the mixing chamber assemblies 522a and 522b, resulting in a more homogenous beverage product being dispensed from the system. The flow restriction between the air ejector assembly and the mix chambers is set to balance with the liquid head in the air ejector at the desired hot flow rates. This is to ensure that a positive liquid level is maintained in the air ejector chamber and that air is not drawn from the air ejector and into the mix chambers.

Hot water flow control valves 530a, 530b control the flows of hot water from the air ejector assembly 520. The hot water flows from the air ejector assembly 520 to a flow splitter that equally divides the flow when both spigots are actuated simultaneously. Upon leaving the splitter, hot water flows through the respective hot water control valves which, when opened, allow the gravity flow of hot water out of the air ejector assembly. Typically, the hot water flow control valves 530a, 530b are open and closed simultaneously with hot water flow control inlet valves 512a and 512b, respectively. This way, an equal amount of water flows into and out of the air ejector assembly. After passing through the solenoid valves, hot water flows to pre-mixing areas 532a, 532b, where the hot water is pre-mixed with beverage concentrate 535 in the internal plumbing upstream of the mixing chamber assembly 522. For dispensing a brewed iced tea beverage, the pre-mixing constitutes the "brewing" step.

The concentrate 535 is pumped by pumps 536a, 536b to the pre-mixing areas 532a, 532b, where the concentrate 535 is mixed with the hot water. Each pump 536 is preferably a peristaltic pump, which is capable of pumping a metered amount of flow at the very low flow rates required for the beverage concentrate 535, typically less than 1 ml per second. Each pump 536a, 536b is actuated when its corresponding spigot is actuated. Additionally, a "sold out" sensor 538, discussed below, detects when the plastic bag 535a needs to be replaced.

The concentrate 535 and the hot water are pre-mixed in the pre-mixing areas 532a, 532b to form pre-mixed solutions. Each pre-mixed solution flows through a "brewing" tube 533a, 533b to one of the mixing chamber assemblies 522a, 522b. The length of the "brewing" tube is adjusted to provide a desired residence time of hot water and concentrate. The desired residence time is preferably within the range of 0.0 to 2.0 seconds, and is more preferably about 0.5 seconds.

In addition-to providing sufficient residence time, each brew tube 533a, 533b should also be designed to provide a specific level of restriction to fluid flow. More specifically, at the desired flow rate of brew water, typically 0.50 oz/sec flowing from the heater tank into the air ejector, the pressure drop from the air ejector, through the brew tube and through the spigot assembly must balance with the hydrostatic head at the air ejector such that a constant liquid level is maintained in the air ejector.

For example, if the fluid restriction in each brew tube is too low, the hot water level in the air ejector may drop and air may be drawn into the brew tube through the air ejector assembly. The addition of air will cause non-homogeneous flow that will be noticeable at the spigot nozzle.

On the other hand, if the fluid restriction in the brew tube is too high, then the water level and back pressure in the air ejector will increase. This will cause an increase in back pressure in the heater tank and cause overflow from the atmospheric vent in the heater tank. The high restriction will cause a reduction of hot water flow rate through the brew tube to a value lower than the desired 0.50 oz/sec., the amount of flow reduction being equivalent to the amount of overflow from the heater tank.

The restriction in the brew tube can be balanced by increasing or decreasing the diameter and length of the brew tube. However, changes in diameter and length of the brew tube also impact internal fluid volume, fluid velocity and residence time. A preferred way of restricting the brew tube is to crimp the tube in one or more locations so as to locally reduce the internal flow area. This way, restriction is increased without a significant reduction in internal volume that would otherwise reduce the residence time. Although not discussed specifically, such restriction is also preferable in the first embodiment.

In each mixing chamber assembly 522a, 522b, the pre-mixed solution is mixed with cold water. Cold water flow control valves 556a, 556b control the flow of the cold water. The cold water flows into each mixing chamber assembly 522a, 522b through a side port 550a, 550b where it is mixed with the pre-mixed solution, and the final beverage product is then dispensed through nozzle or spigot 552a, 552b.

A rinse valve 554 allows hot water to be flushed through mixing tees 540a, 540b, inlet ports 550a, 550b, and mixing chamber assemblies 522a, 522b.

In this embodiment, an additive 544, such as liquid sweetener, can also be added to the mixing chambers 522a, 522b. The sweetener is pumped by a pump 546 to one of the mixing tees 540a, where it mixes with the cold water prior to entering the mixing chamber assembly 522a. An additive flow control valve 542 controls the flow of the additive, and a sold out pressure switch 548 detects when the additive supply needs to be replenished. The amount of the additive can be controlled by adjusting the additive control valve 542. Additionally, an additive adjustment knob may be provided to allow easy adjustment of the additive amount.

The sold-out sensor 538 in the second embodiment is similar to either of the alternative sold-out sensors 138, 138' described in the first embodiment. However, fluid from exit port 425 is used to supply two pumps 136a, 136b. Accordingly, two suction tubes 430a, 430b are connected to exit port 425. In all other respects, sensor 538 operates similarly as the sensors in the first embodiment.

In operation, a microprocessor (not shown) on a circuit board 36 activates the associated flow control valves, concentrate pumps, and additive pump, and starts the dispensing process. Additionally, transformers provide power to the system.

Figure 15:
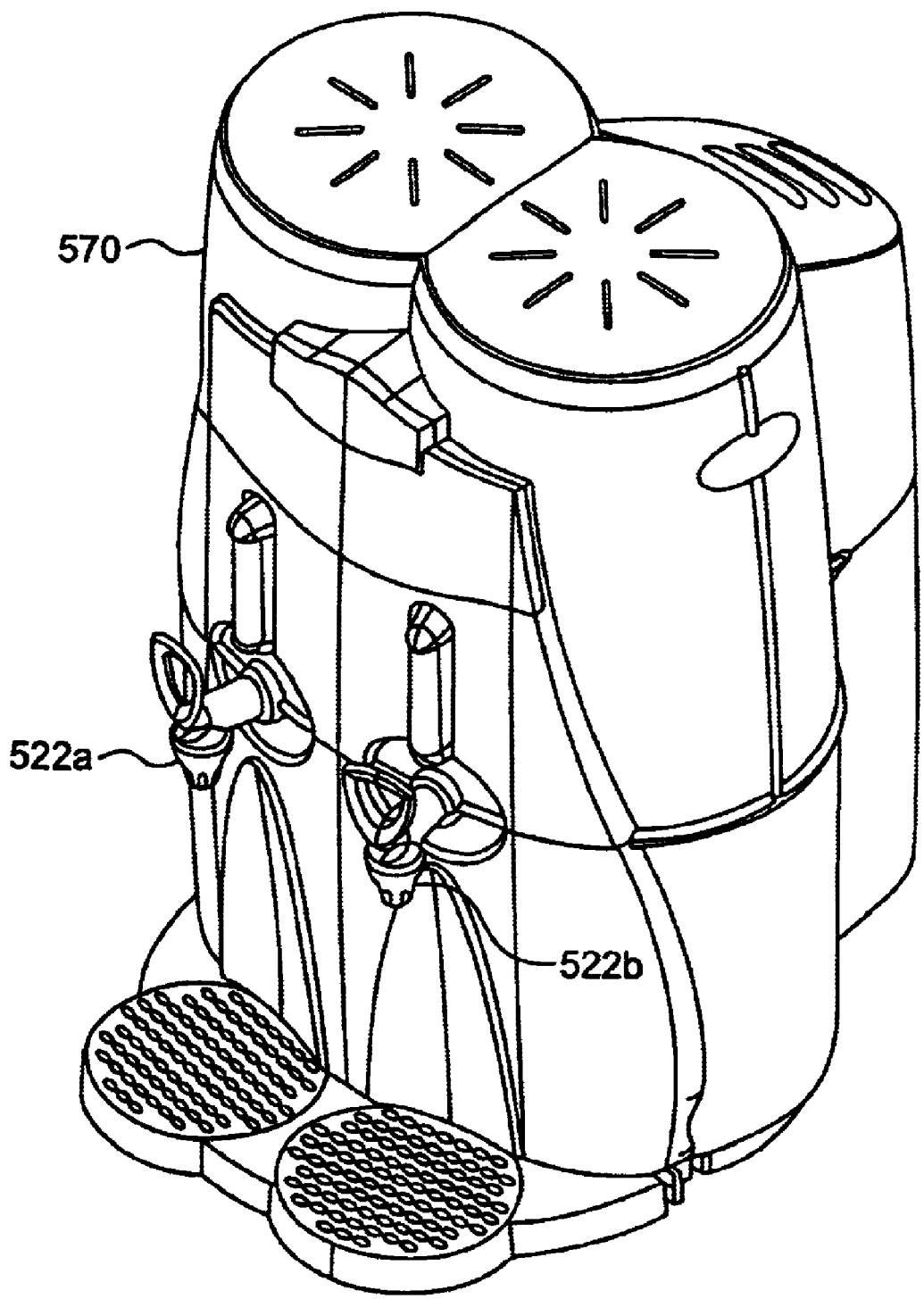
FIG. 15 is a conceptual view of the exterior cladding of the beverage dispenser according to the second embodiment of the present invention.

FIG. 15 shows a conceptual design of exterior cladding 570 that provides the appearance of a real leaf tea brewer but which is actually a post-mix system according to the present invention. The exterior cladding 570 is attached to support structure similar to that shown in FIGS. 8–10.

The individual components of the present invention described herein are not limited to application in beverage dispensing systems. For example, the air ejector assembly is useful in any application of removing air from fluid lines, and the sensor is useful in any application to determine a depleted condition of a liquid in a reservoir.

It is preferable to use the present invention with computer hardware that performs the processing and implementing functions. As will be appreciated by those skilled in the art, the systems, methods, and procedures described herein can be embodied in or with a programmable computer, computer executable software, or digital circuitry. The software can be stored on computer readable media, for example, on a floppy disk, RAM, ROM, a hard disk, removable media, flash memory, memory sticks, optical media, magneto-optical media, CD-ROMs, etc. The digital circuitry can include integrated circuits, gate arrays, building block logic, field programmable gate arrays (FPGA), etc.

Although specific embodiments of the present invention have been described above in detail, it will be understood that this description is merely for purposes of illustration. Various modifications of the disclosed aspects of the preferred embodiments, in addition to those described above, may be made by those skilled in the art without departing from the spirit of the present invention defined in the following claims, the scope of which is to be accorded the broadest interpretation so as to encompass such modifications and equivalent structures.

We claim:

1. A beverage dispensing apparatus, comprising:
   first and second dispensing devices;
   a single hot water heater for heating water for supply to said first and second dispensing devices;
   at least one concentrate pump distributing concentrate;
   first and second water inlet valves for controlling water supply to said hot water heater;
   first and second hot water outlet valves for controlling discharge of hot water from said hot water heater to said first and second dispensing devices, respectively; and
   a controller for controlling at least said first and second water inlet valves and said first and second hot water outlet valves.

2. An apparatus according to claim 1, wherein when said first dispensing device is actuated, said controller controls said first water inlet valve to open and said first hot water outlet valve to open, and when said second dispensing device is actuated, said controller controls said second water inlet valve and said second hot water outlet valve to open.

3. An apparatus according to claim 2, wherein the flow of water through said first water inlet valve and said first hot water outlet valve are equal at any given time.

4. An apparatus according to claim 1, further comprising first and second concentrate pumps, wherein when said first dispensing device is actuated, said first concentrate pump is actuated and when said second dispensing device is actuated, said second concentrate pump is actuated.

5. An apparatus according to claim 1, further comprising a support structure supporting said first and second dispensing devices, said first and second water inlet valves and said first and second hot water outlet valves, and exterior cladding attached to said support structure, said exterior cladding providing the appearance of a real brewer or urn.

6. An apparatus according to claim 1, further comprising first and second mixing passages disposed between said first and second hot water outlet valves and said first and second dispensing devices, respectively, said first and second mixing passages allowing the hot water and concentrate to intermix for a predetermined residence time.

7. An apparatus according to claim 6, wherein the predetermined residence time is determined by at least one of varying the length of, varying the internal diameter of, or crimping said first and second mixing passages.

* * * * *